(12) United States Patent
Li et al.

(10) Patent No.: US 12,143,590 B2
(45) Date of Patent: Nov. 12, 2024

(54) AFFINE ESTIMATION IN PRE-ANALYSIS OF ENCODER

(71) Applicant: Tencent America LLC, Palo Alto, CA (US)

(72) Inventors: Guichun Li, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 73 days.

(21) Appl. No.: 17/983,370

(22) Filed: Nov. 8, 2022

(65) Prior Publication Data

US 2023/0291908 A1 Sep. 14, 2023

Related U.S. Application Data

(60) Provisional application No. 63/306,886, filed on Feb. 4, 2022.

(51) Int. Cl.
| | |
|---|---|
| *H04N 19/137* | (2014.01) |
| *H04N 19/105* | (2014.01) |
| *H04N 19/132* | (2014.01) |
| *H04N 19/176* | (2014.01) |
| *H04N 19/46* | (2014.01) |

(52) U.S. Cl.
CPC ......... *H04N 19/137* (2014.11); *H04N 19/105* (2014.11); *H04N 19/132* (2014.11); *H04N 19/176* (2014.11); *H04N 19/46* (2014.11)

(58) Field of Classification Search
CPC .. H04N 19/137; H04N 19/105; H04N 19/132; H04N 19/176; H04N 19/46

USPC .................................................... 375/240.02
See application file for complete search history.

(56) References Cited

U.S. PATENT DOCUMENTS

| | | |
|---|---|---|
| 2020/0021840 A1 | 1/2020 | Xu et al. |
| 2021/0368203 A1 | 11/2021 | Zhang et al. |

FOREIGN PATENT DOCUMENTS

| | | |
|---|---|---|
| WO | 2021055643 A1 | 3/2021 |

OTHER PUBLICATIONS

International Search Report and Written Opinion issued in Application No. PCT/US2022/079761, mailed Feb. 3, 2023, 13 pages.
Benjamin Bross et al., Versatile Video Coding Editorial Refinements on Draft 10, Joint Video Experts Team (JVET) of ITU-T SG 16 WP 3 and ISO/IEC JTC 1/SC 29, 20th Meeting, by teleconference, Oct. 7-16, 2020, Document: JVET-T2001-v2, pp. 1-511.

(Continued)

*Primary Examiner* — Nguyen T Truong
(74) *Attorney, Agent, or Firm* — ArentFox Schiff LLP

(57) ABSTRACT

An affine motion estimation (ME) is performed on a current block to determine affine parameters of the current block in a pre-analysis stage. The affine ME is performed based on at least one of (i) a down-scaled current picture and one or more down-scaled reference pictures of the down-scaled current picture, (ii) a simplified configuration, or (iii) a fixed block size of the current block being equal to or larger than a threshold. The affine parameters of the current block determined in the pre-analysis stage are stored. Affine parameters of the current block are determined based on the affine parameters stored in the pre-analysis stage. The current block is reconstructed based on the determined affine parameters of the current block.

20 Claims, 23 Drawing Sheets

(56) References Cited

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

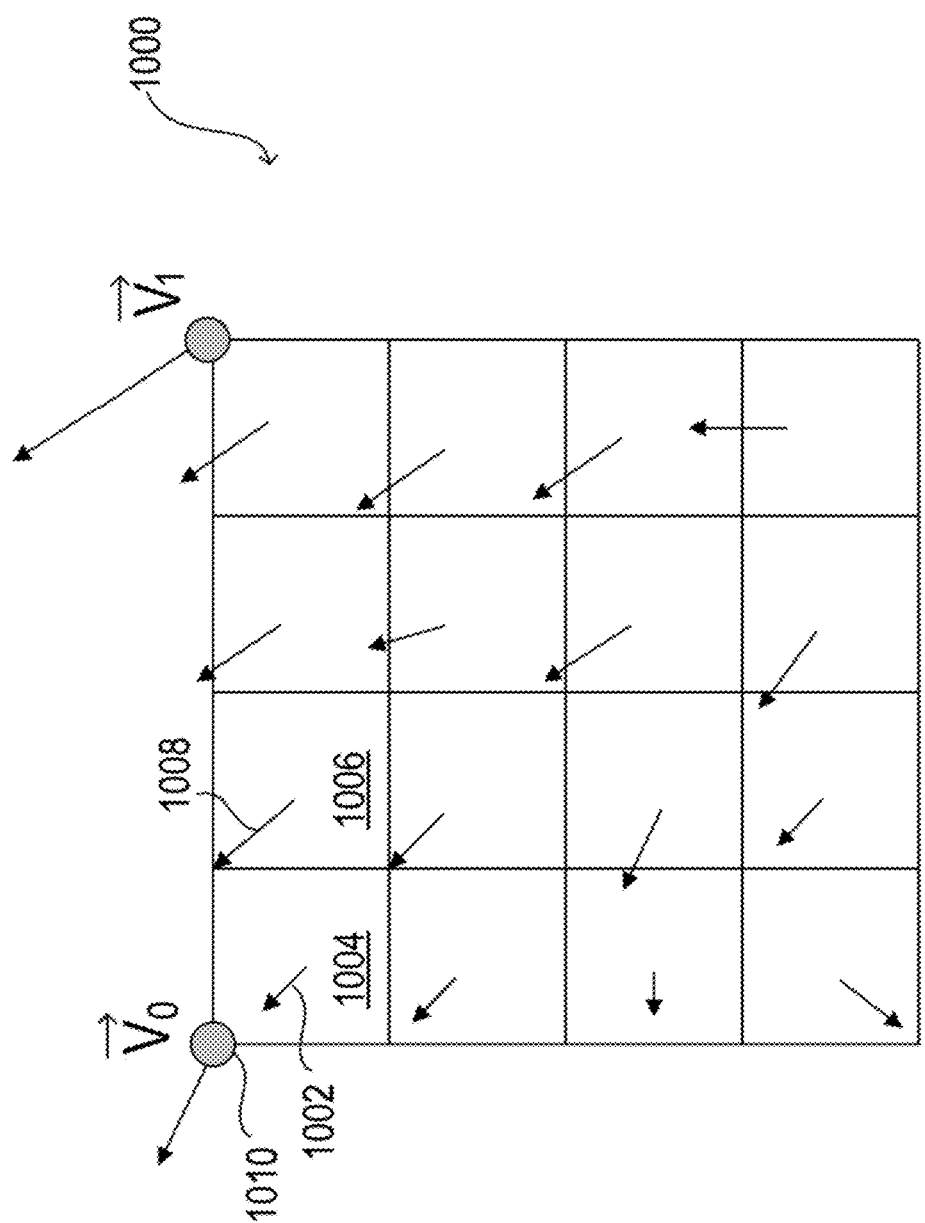

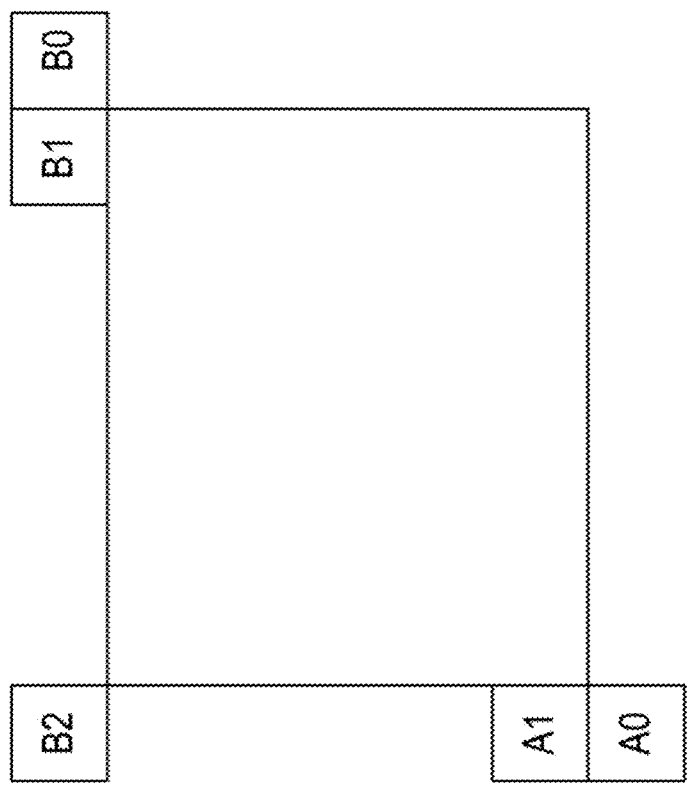

FIG. 19

AFFINE ESTIMATION IN PRE-ANALYSIS OF ENCODER

INCORPORATION BY REFERENCE

The present application claims the benefit of priority to U.S. Provisional Application No. 63/306,886, "Affine Estimation in Pre-analysis of Encoder" filed on Feb. 4, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video encoding/decoding includes processing circuitry.

According to an aspect of the disclosure, a method of video encoding performed in a video encoder is provided. In the method, an affine motion estimation (ME) can be performed on a current block of a current picture to determine affine parameters of the current block in a pre-analysis stage. The affine ME can be performed based on at least one of (i) a down-scaled current picture that is down scaled from the current picture and one or more down-scaled reference pictures of the current picture, (ii) a simplified configuration, or (iii) a fixed block size of the current block being equal to or larger than a threshold. The affine parameters of the current block determined in the pre-analysis stage can be stored. Affine parameters of the current block can be determined based on the affine parameters stored in the pre-analysis stage. The current block can be reconstructed based on the determined affine parameters of the current block.

In some embodiments, the affine parameters of the current block determined in the pre-analysis stage can be stored in response to a cost value of the current block being less than a total cost value of subblocks of the current block. A flag that indicates whether the cost value of the current block is less than the total cost value can be stored.

To perform the affine ME based on the simplified configuration, the affine ME can be performed based on a uni-prediction in which one of the one or more down-scaled reference pictures is applied. The affine ME can be performed without a prediction refinement using optical flow (PROF) process. The affine ME can be performed with a reduced iteration number.

In some embodiments, the predefined fixed block size can be equal to one of 64 by 64 luma samples or 32 by 32 luma samples.

In the method, the block size of the current block can further be stored with the affine parameters and the flag.

In the method, base control point motion vectors (CPMVs) can be determined for the affine ME in the pre-analysis stage, where the base CPMVs can be a start point of the affine ME.

In an example, the base CPMVs can be determined based on a selected translational motion vector (MV) of the current block that is derived based on a translational ME performed on the current block. In an example, the base CPMVs can be determined based on an average of a set of translational MVs of the subblocks of the current block, where the set of MVs of the subblocks can be derived by performing the translational ME on the subblocks of the current block. In an example, the base CPMVs can be determined based on the set of translational MVs of the subblocks of the current block. In an example, the base CPMVs can be determined based on a constructed affine predictor of the current block, where the constructed affine predictor can be determined based on translational MVs of neighboring blocks of the current block that are determined in the pre-analysis stage. In an example, the base CPMVs can be determined based on an affine model that is inherited from a neighboring block of the current block.

The stored affine parameters can include one of control point motion vector values, parameters associated with a 4-parameter affine motion model, parameters associated with a 6-parameter affine motion model, or an integer with N bits.

To perform the affine ME on the current block of the current picture to determine the affine parameters, an initial predictor of the current block can be determined based on the base CPMVs of the current block. A first predictor of the current block can be determined based on the initial predictor. The first predictor can be equal to a sum of (i) the initial predictor of the current block, (ii) a product of a first component of a gradient value of the initial predictor and a first component of a motion vector difference associated with the initial predictor and the first predictor, and (iii) a product of a second component of the gradient value of the initial predictor and a second component of the motion vector difference.

CPMVs of the current block that correspond to the affine parameters can further be determined based on an N-th predictor associated with the current block in response to one of: (i) N being equal to the reduced iteration number, and (ii) a motion vector difference associated with the N-th predictor and a (N+1)-th predictor of the current block being zero. Prediction samples of the current block can be determined based on the determined CPMVs. The cost value can be associated with the prediction samples of the current block and initial samples of the current block.

In some embodiments, a translational ME can be skipped for the current block in response to the current block being performed with the affine ME in the pre-analysis stage and the flag indicating that the cost value of the current block is less than the total cost value of the subblocks of the current block. The affine parameters can be determined based on another affine ME.

In some embodiments, the affine parameters of the current block can be determined as the stored affine parameters in response to the current block being performed with the affine ME in the pre-analysis stage and the flag indicating that the cost value of the current block is less than the total cost value of the subblocks of the current block.

In some embodiments, the affine parameters of the current block can be determined based on another affine ME. The other affine ME can be performed based on (i) a full resolution current picture and one or more full-resolution reference pictures of the current picture and (ii) a starting point generated based on the stored affine parameters.

In some embodiments, an affine merge candidate for the current block can be skipped based on a delta between candidate affine parameters associated with the affine merge candidate and the stored affine parameters being larger than a threshold.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video encoding/decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 10 shows an exemplary schematic illustration of an affine motion vector field associated with sub-blocks in a block.

FIG. 11 shows a schematic illustration of exemplary positions of spatial merge candidates.

FIG. 19 shows exemplary motion vector prediction candidates of a current block.

DETAILED DESCRIPTION OF EMBODIMENTS

Figure 1A:
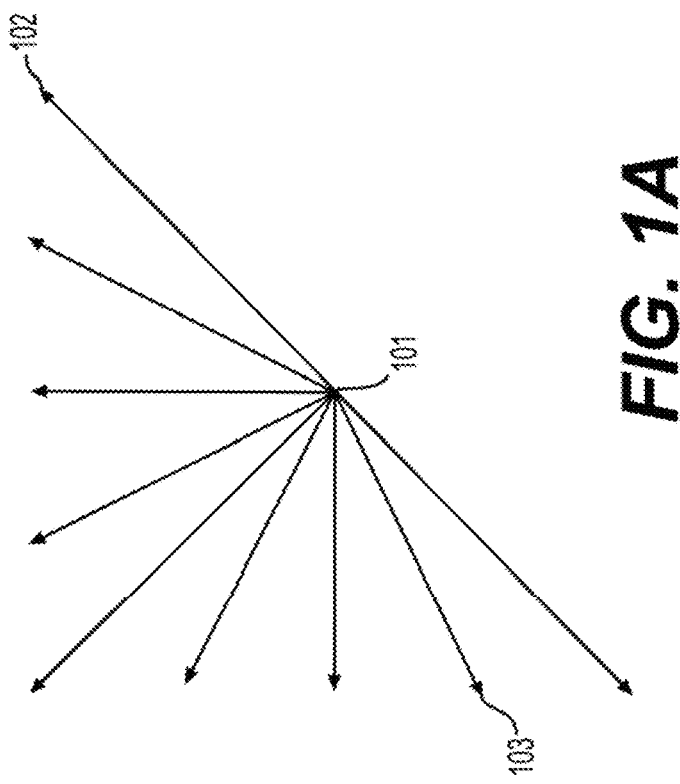
FIG. 1A is a schematic illustration of an exemplary subset of intra prediction modes.
Figure 1B:
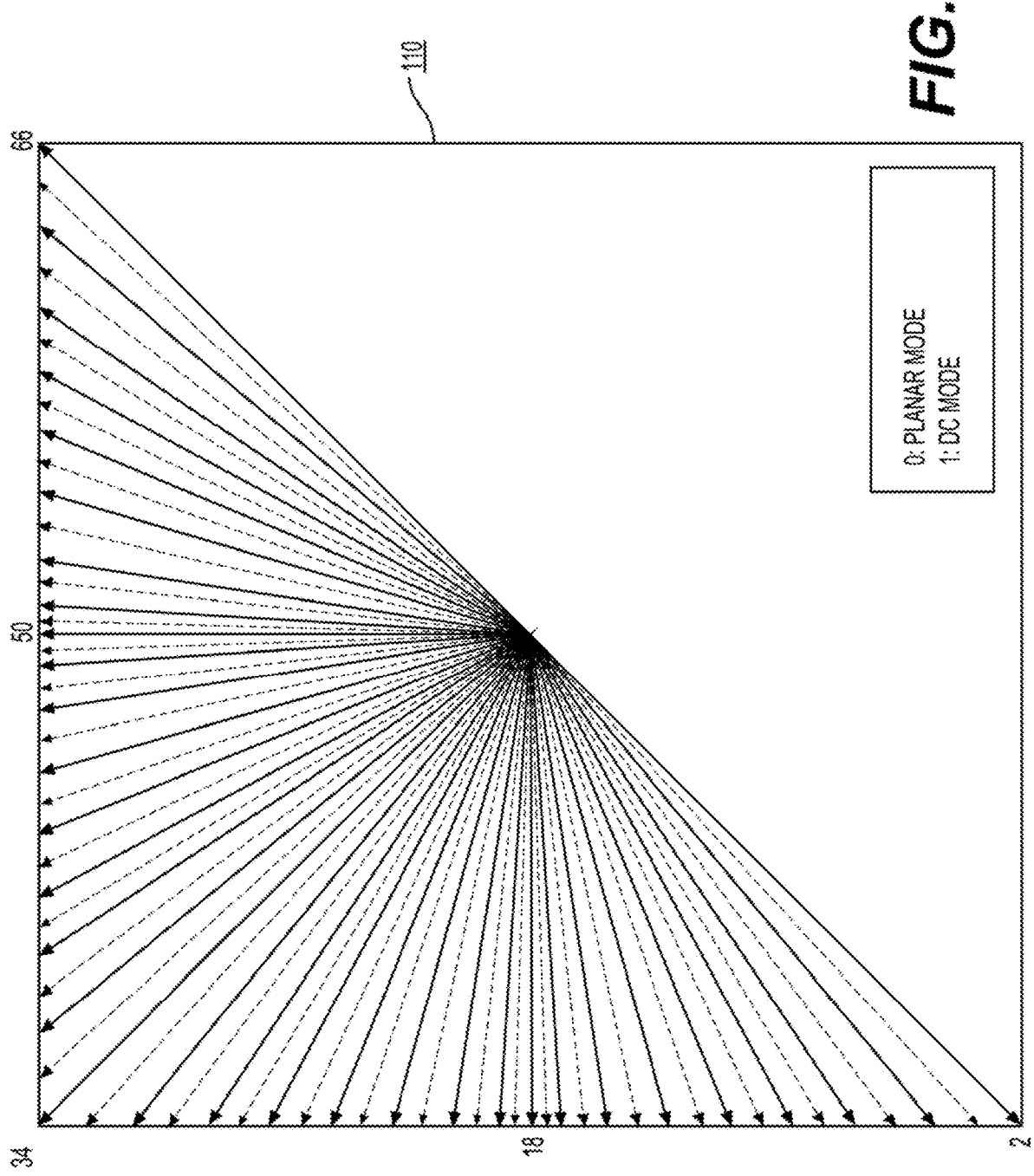
FIG. 1B is an illustration of exemplary intra prediction directions.
Figure 2:
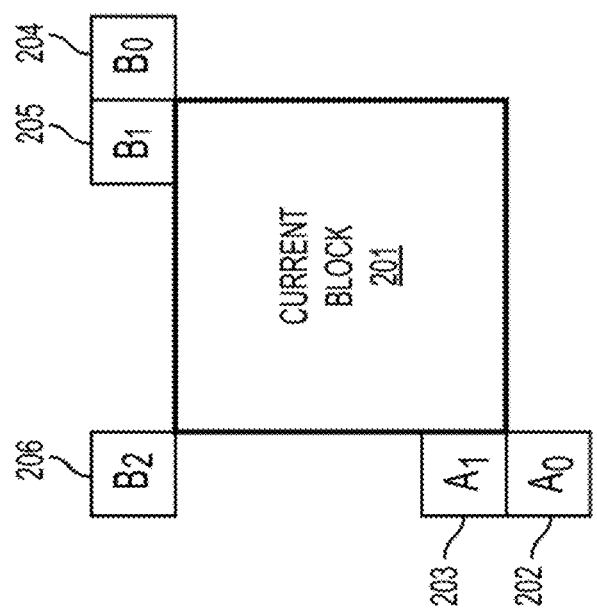
FIG. 2 is a schematic illustration of a current block and its surrounding spatial merge candidates in one example.
Figure 3:
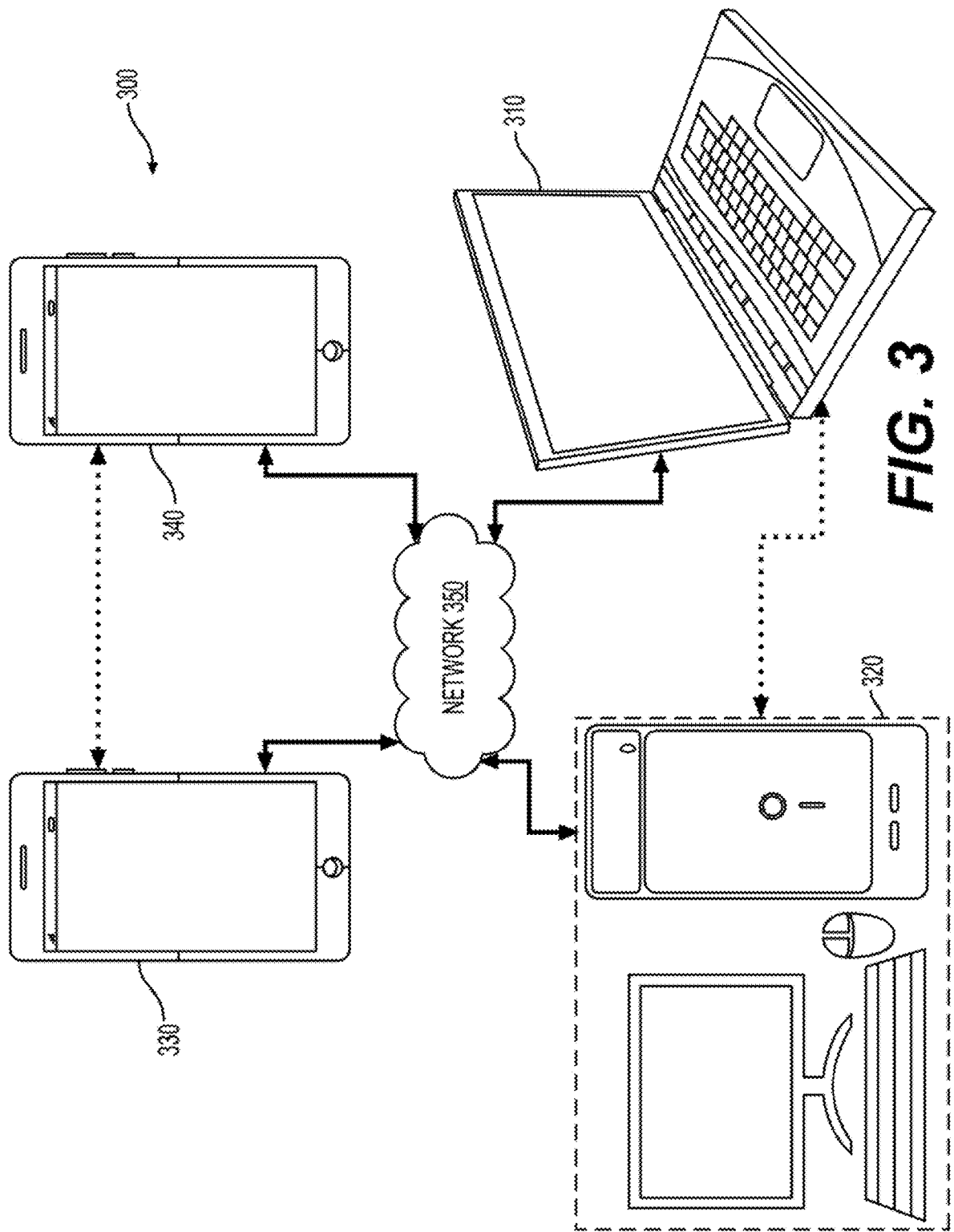
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
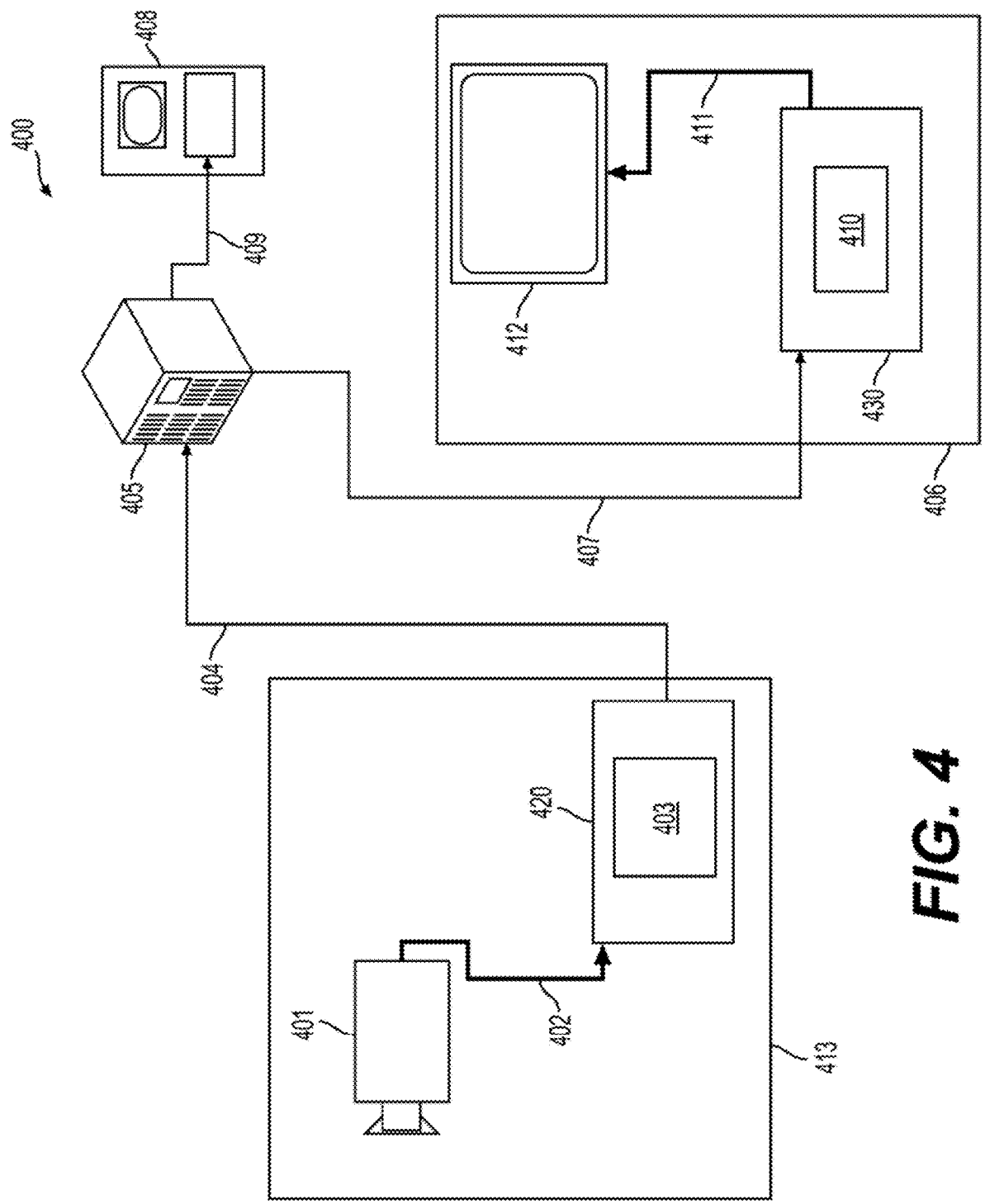
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
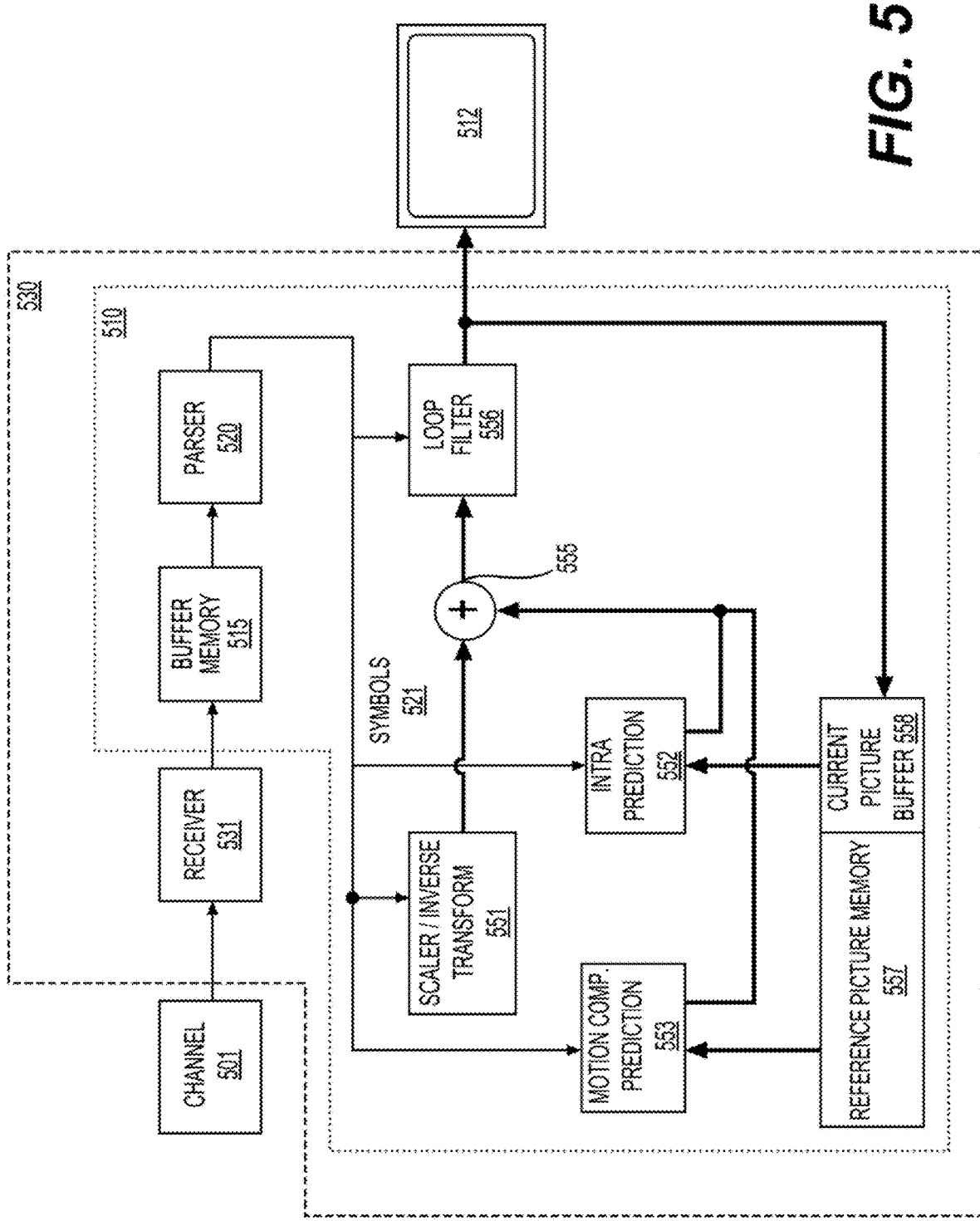
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
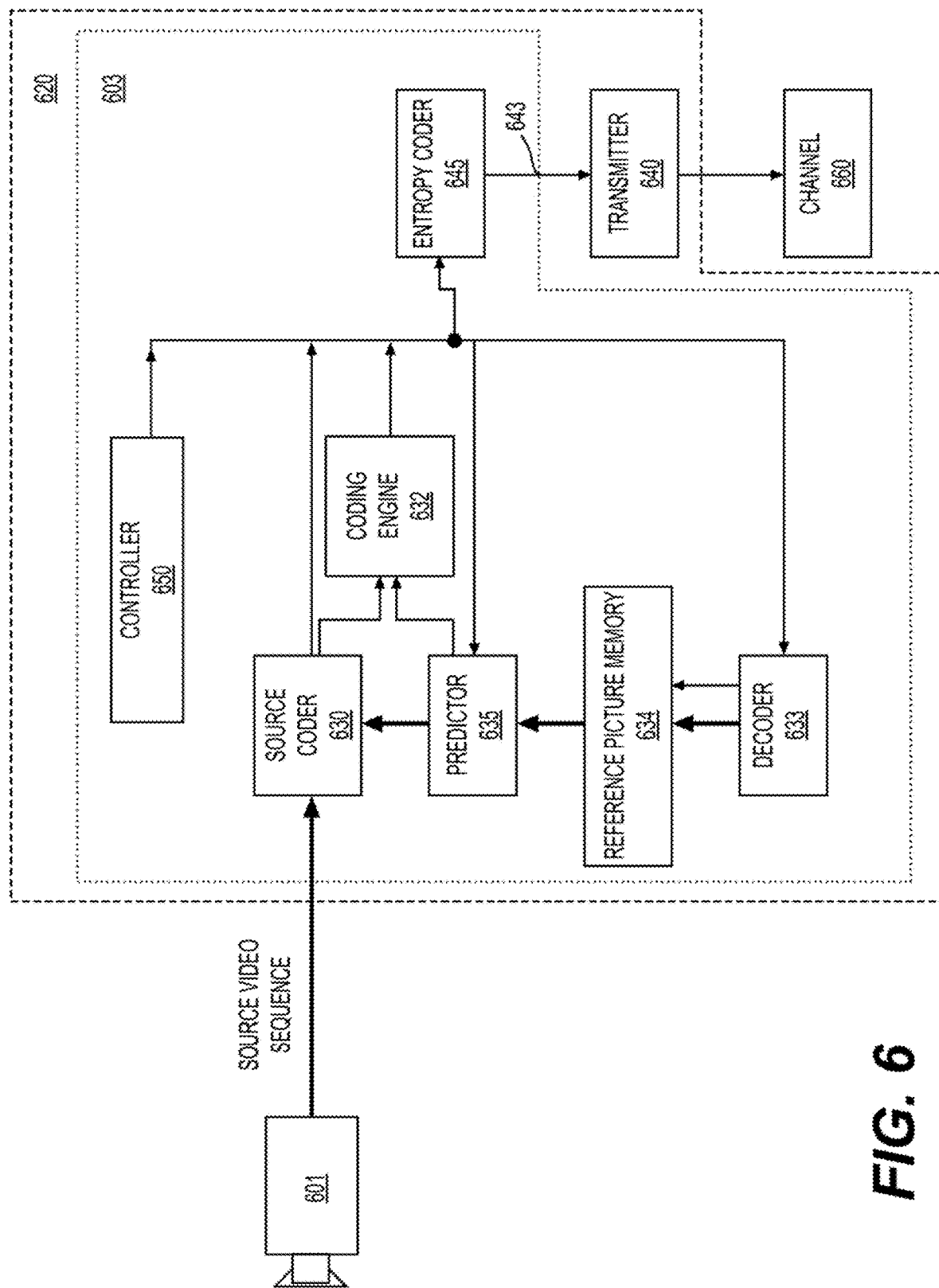
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
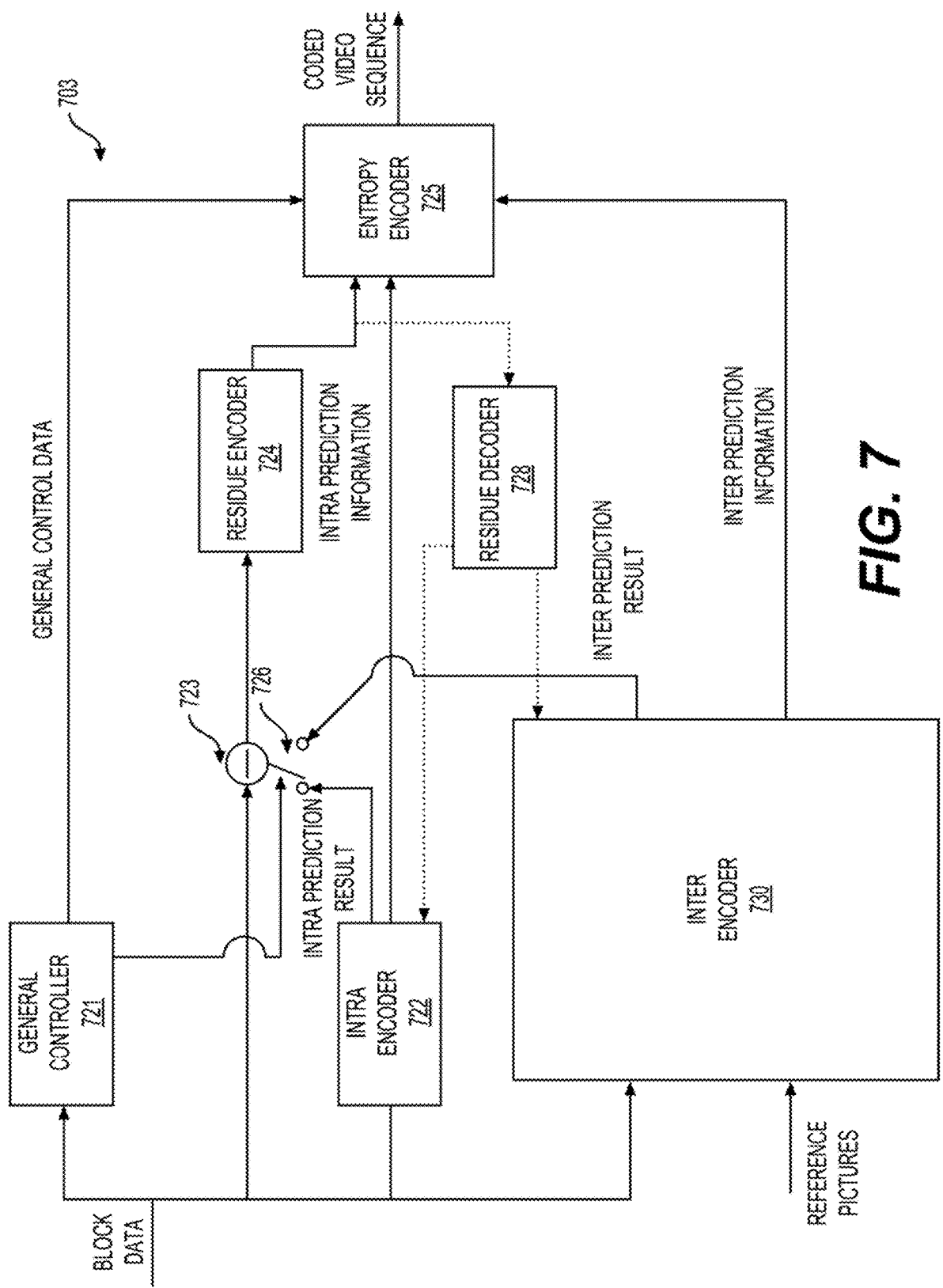
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
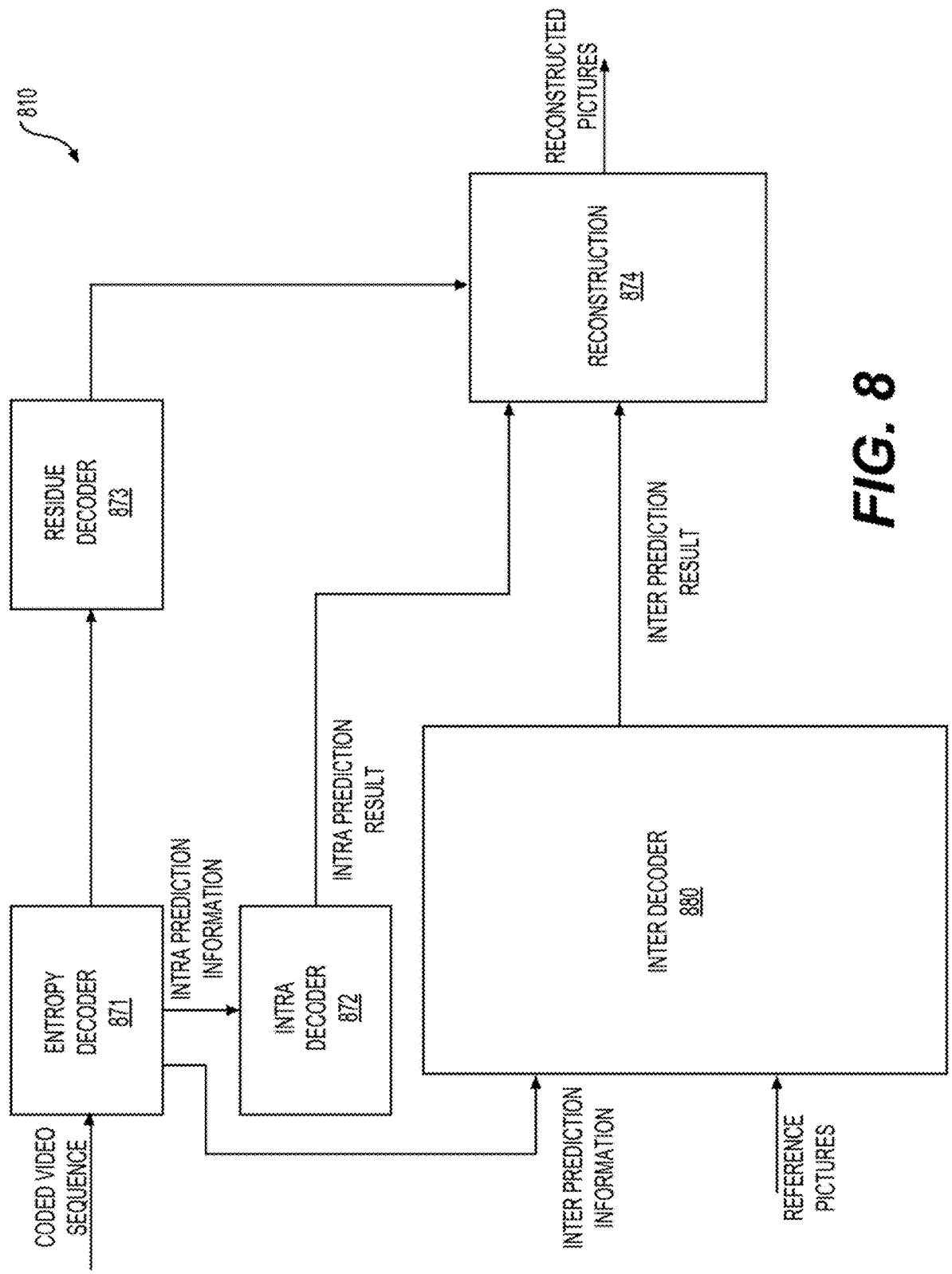
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to estimation of an affine inter prediction. For example, an affine inter prediction mode can be estimated in a pre-analysis stage by an encoder.

ITU-T VCEG (Q6/16) and ISO/IEC MPEG (JTC 1/SC 29a/WG 11) published the H.265/HEVC (High Efficiency Video Coding) standard in 2013 (version 1), 2014 (version 2), 2015 (version 3), and 2016 (version 4). In 2015, the two standard organizations jointly formed JVET (Joint Video Exploration Team) to explore the potential of developing a next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CP responses were evaluated in the 122 MPEG/ 10th JVET meeting. As a result of the meeting, JVET formally launched a standardization process of next-generation video coding beyond HEVC. The new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:

(1) Extended merge prediction
(2) Merge motion vector difference (MMVD)
(3) Advanced Motion Vector Prediction (AMVP) mode with symmetric MVD signalling (4) Affine motion compensated prediction
(5) Subblock-based temporal motion vector prediction (SbTMVP)
(6) Adaptive motion vector resolution (AMVR)
(7) Motion field storage: $1/16^{th}$ luma sample MV storage and 8×8 motion field compression
(8) Bi-prediction with CU-level weights (BCW)
(9) Bi-directional optical flow (BDOF)
(10) Decoder-side motion vector refinement (DMVR)
(11) Combined inter and intra prediction (CIIP)
(12) Geometric partitioning mode (GPM)

Figure 9B:
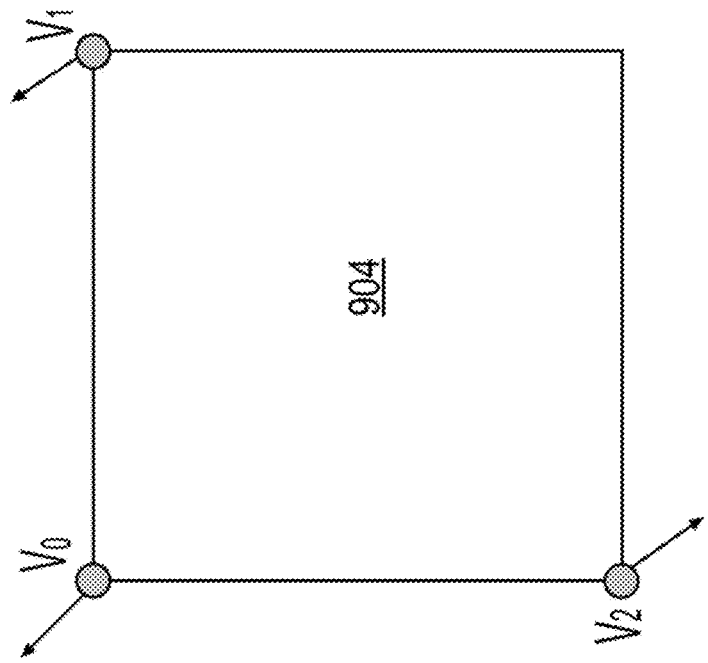
FIG. 9B shows an exemplary schematic illustration of a 6-parameter affine model.
Figure 9A:
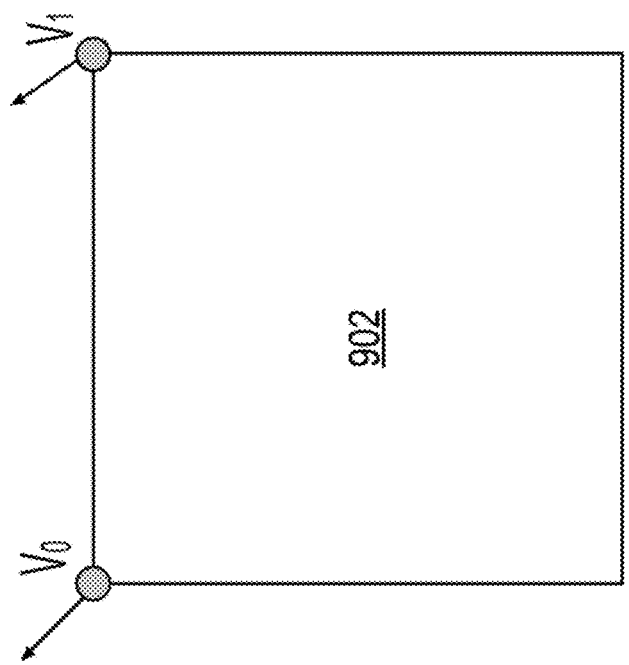
FIG. 9A shows an exemplary schematic illustration of a 4-parameter affine model.

In HEVC, a translation motion model is applied for motion compensation prediction (MCP). While in the real world, many kinds of motions can exist, such as zoom in/out, rotation, perspective motions, and other irregular motions. A block-based affine transform motion compensation prediction can be applied, such as in VTM. FIG. 9A shows an affine motion field of a block (902) described by motion information of two control points (4-parameter). FIG. 9B shows an affine motion field of a block (904) described by three control point motion vectors (6-parameter).

As shown in FIG. 9A, in the 4-parameter affine motion model, a motion vector at a sample location (x,y) in the block (902) can be derived in equation (1) as follows:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad \text{Eq. (1)}$$

where $mv_x$ can be the motion vector in a first direction (or X direction) and $mv_y$ can be the motion vector in a second direction (or Y direction). The motion vector can also be described in equation (2):

$$\begin{cases} mv_x = ax + by + c \\ mv_y = -bx + ay + f \end{cases} \quad \text{Eq. (2)}$$

As shown in FIG. 9B, in the 6-parameter affine motion model, a motion vector at a sample location (x,y) in the block (904) can be derived in equation (3) as follows:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. (3)}$$

The 6-parameter affine motion model can also described in equation (4) as follows:

$$\begin{cases} mv_x = ax + by + c \\ mv_y = dx + ey + f \end{cases} \quad \text{Eq. (4)}$$

As shown in equations (1) and (3), ($mv_{0x}$, $mv_{0y}$) can be a motion vector of a top-left corner control point. ($mv_{1x}$, $mv_{1y}$) can be motion vector of a top-right corner control point. ($mv_{2x}$, $mv_{2y}$) can be a motion vector of a bottom-left corner control point.

As shown in FIG. 10, to simplify the motion compensation prediction, block-based affine transform prediction can be applied. To derive a motion vector of each 4×4 luma sub-block, a motion vector of a center sample (e.g., (1002)) of each sub-block (e.g., (1004)) in a current block (1000) can be calculated according to the equations (1)-(4), and rounded to $1/16$ fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma sub-blocks.

In affine merge prediction, an affine merge (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to derive the affine merge candidate list: (1) inherited affine merge candidates that are extrapolated from CPMVs of neighbour CUs, (2) constructed affine merge candidates with CPMVPs that are derived using translational MVs (e.g., MVs that only include translational factors, such as merge MVs) of neighbour CUs, and (3) Zero MVs.

Figure 12:
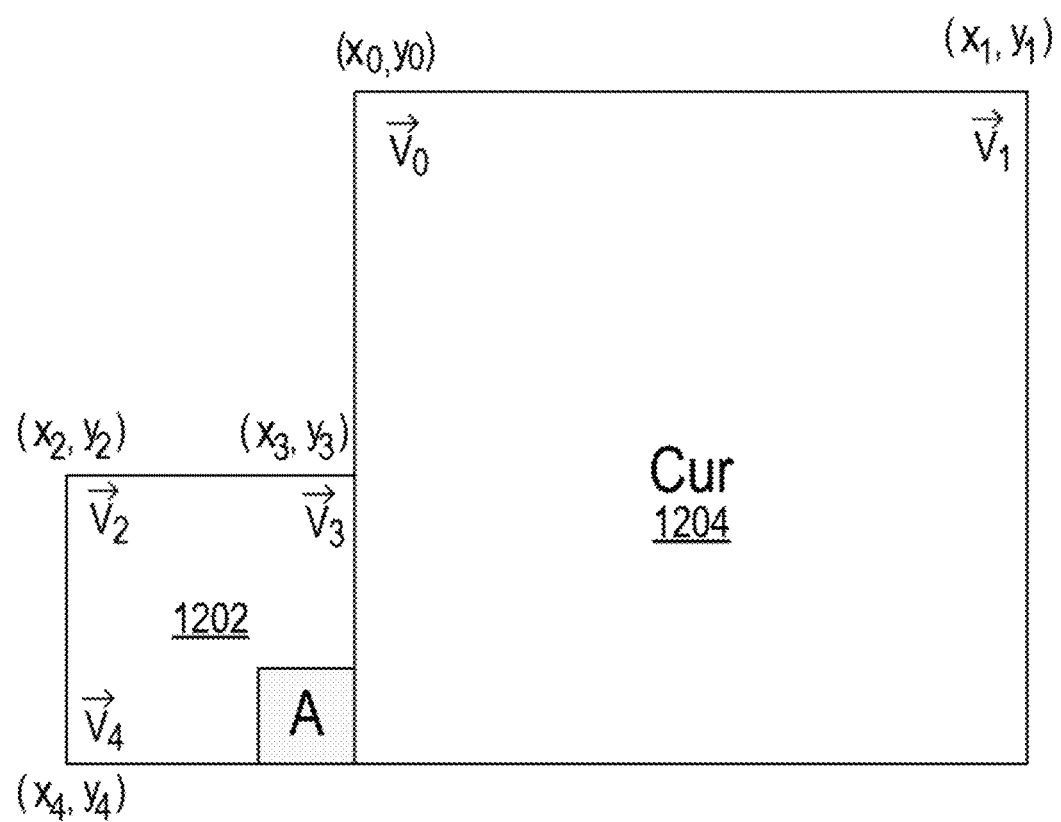
FIG. 12 shows an exemplary schematic illustration of control point motion vector inheritance.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 11. As shown in FIG. 11, for a left predictor (or a left inherited affine candidate), a scan order can be A0→A1, and for an above predictor (or an above inherited affine candidate), a scan order can be B0→B1→B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 12, when a neighboring left bottom block A of a current block (1204) is coded in affine mode, motion vectors $v_2$, $v_3$, and $v_4$ of a top left corner, an above right corner, and a left bottom corner of a CU (1202) which contains the block A can be attained. When the block A is coded with a 4-parameter affine model, two CPMVs of the current CU (1204) can be calculated according to $v_2$, and $v_3$ of the CU (1202). In a case that block A is coded with a 6-parameter affine model, three CPMVs of the current CU (1204) can be calculated according to $v_2$, $v_3$, and $v_4$ of the CU (1202).

Figure 13:
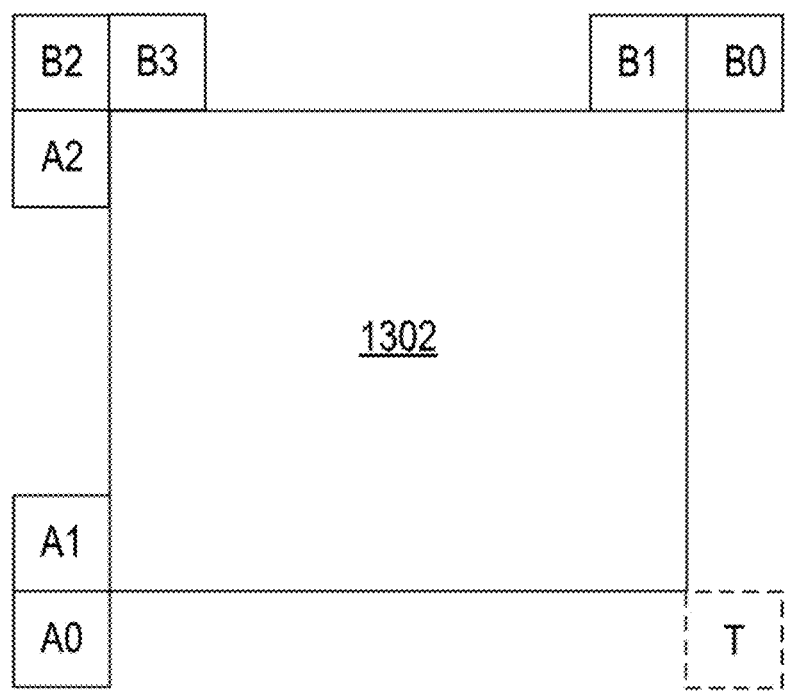
FIG. 13 shows an exemplary schematic illustration of locations of candidates for constructed affine merge mode.

A constructed affine candidate of a current block can be a candidate that is constructed by combining neighbor translational motion information of each control point of the current block. The motion information of the control points can be derived from specified spatial neighbors and a temporal neighbor that can be shown in FIG. 13. As shown in FIG. 13, $CPMV_k$ (k=1, 2, 3, 4) represents a k-th control point of a current block (1302). For $CPMV_1$, B2→B3→A2 blocks can be checked and an MV of the first available block can be used. For $CPMV_2$, B1→B0 blocks can be checked. For $CPMV_3$, A1→A0 blocks can be checked. TMVP can be used as $CPMV_4$ if $CPM_4$ is not available.

After MVs of four control points are attained, affine merge candidates can be constructed for the current block (1302) based on motion information of the four control points. For example, the affine merge candidates can be constructed based on combinations of the MVs of the four control points in an order as follows: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After one or more inherited affine merge candidates and constructed affine merge candidates are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUs,
(2) Constructed affine AMVP candidates with CPMVPs that are derived using the translational MVs of the neighbour CUs,
(3) Translational MVs from neighboring CUs, and
(40 Zero MVs.

A checking order of inherited affine AMVP candidates can be the same as a checking order of inherited affine merge candidates. To determine an AVMP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 13, the same checking order can be applied as the checking order in affine merge candidate construction. In addition, a reference picture index of a neighboring block can also be checked. A first block in the checking order can be inter coded and have the same reference picture as the current CU (1302). One constructed AMVP candidate can be determined when the current CU (1302) is coded with a 4-parameter affine mode, and $mv_0$ and $mv_1$ are both available. The constructed AMPV candidate can further be added to the affine AMVP list. When the current CU (1302) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, $mv_0$, $mv_1$ and $mv_2$ can be added, in order. The $mv_0$, $mv_1$ and $mv_2$ can function as translational MVs to predict all control point MVs of the current CU (e.g., (1302)) when available. Finally, zero MVs can be used to fill the affine AMVP list if the affine AMVP is still not full.

Subblock-based affine motion compensation can save memory access bandwidth and reduce computational complexity compared to pixel-based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction I(i,j).

Step (2): spatial gradients $g_x(i,j)$ and $g_y(i,j)$ of the subblock prediction can be calculated at each sample location using a 3-tap filter [−1, 0, 1]. The gradient calculation can be the same as gradient calculation in BDOF. For example, the spatial gradients $g_x(i,j)$ and $g_y(i,j)$ can be calculated based on equations (5) and (6) respectively.

$$g_x(i,j) = (I(i+1,j) \gg \text{shift1}) - (I(i-1,j) \gg \text{shift1}) \quad \text{Eq. (5)}$$

$$g_y(i,j) = (I(i,j+1) \gg \text{shift1}) - (1(i,j-1) \gg \text{shift1}) \quad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 14:
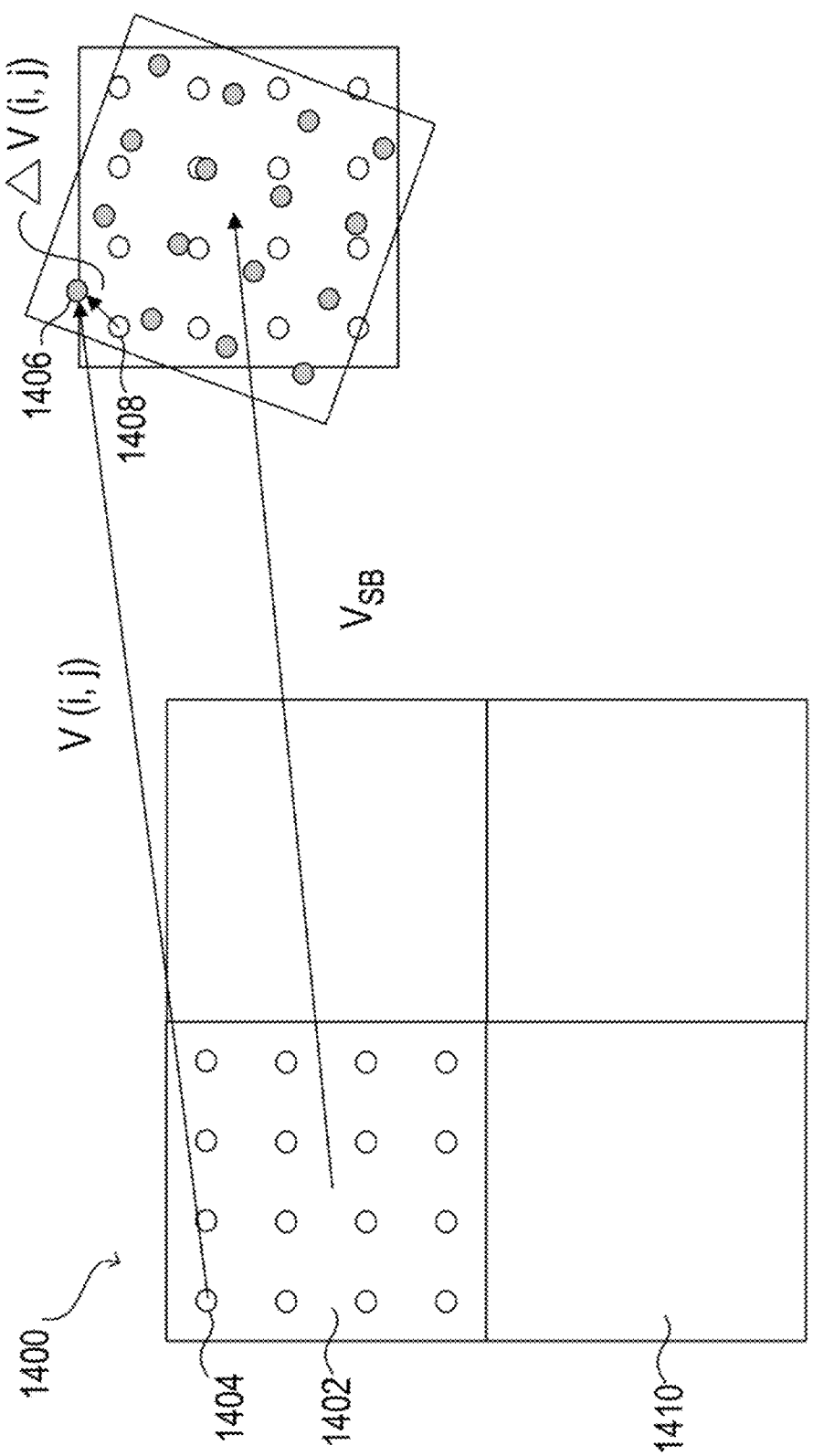
FIG. 14 shows an exemplary schematic illustration of a prediction refinement with optical flow (PROF).

Step (3): luma prediction refinement can be calculated by an optical flow equation as shown in equation (7).

$$\Delta I(i,j) = g_x(i,j) * \Delta v_x(i,j) + g_y(i,j) * \Delta v_y(i,j) \quad \text{Eq. (7)}$$

where Δv(i,j) can be a difference between a sample MV computed for a sample location (i,j), denoted by v(i,j), and a subblock MV, denoted by $v_{SB}$, of a subblock to which the sample (i,j) belongs. FIG. 14 shows an exemplary illustration of the difference between the sample MV and the subblock MV. As shown in FIG. 14, a subblock (1402) can be included in a current block (1400) and a sample (1404) can be included in the subblock (1402). The sample (1404) can include a sample motion vector v(i,j) that corresponds to a reference pixel (1406). The subblock (1402) can include a subblock motion vector $v_{SB}$. Based on the subblock motion vector $v_{SB}$, the sample (1404) can correspond to a reference pixel (1408). A difference between the sample MV and the subblock MV, denoted by Δv(i,j), can be indicated by a difference between the reference pixel (1406) and the reference pixel (1408). The Δv(i,j) can be quantized in a unit of 1/32 luma sample precision.

Since affine model parameters and a sample location relative to a subblock center may not be changed from a subblock to another subblock, Δv(i,j) can be calculated for a first subblock (e.g., (1402)), and reused for other subblocks (e.g., (1410)) in the same CU (e.g., (1400)). Let dx(i,j) be a horizontal offset and dy(i,j) be a vertical offset from a sample location (i,j) to a center of a subblock ($x_{SB}$,$y_{SB}$), Δv(x,y) can be derived by equations (8) and (9) as follows:

$$\begin{cases} dx(i,j) = i - x_{SB} \\ dy(i,j) = j - y_{SB} \end{cases} \qquad \text{Eq. (8)}$$

$$\begin{cases} \Delta v_x(i,j) = C*dx(i,j) + D*dy(i,j) \\ \Delta v_y(i,j) = E*(dx(i,j) + F*dy(i,j) \end{cases} \qquad \text{Eq. (9)}$$

In order to maintain accuracy, the center of the subblock $(x_{SB}, y_{SB})$ can be calculated as $((W_{SB}-1)/2, (H_{SB}-1)/2)$, where $W_{SB}$ and $HS_B$ are the subblock width and height, respectively.

Once $\Delta v(x,y)$ is obtained, parameters of the affine model can be obtained. For example, for a 4-parameter affine model, the parameters of the affine model can be shown in equation (10).

$$\begin{cases} C = F = \dfrac{v_{1x} - v_{0x}}{w} \\ E = -D = \dfrac{v_{1y} - v_{0y}}{w} \end{cases} \qquad \text{Eq. (10)}$$

For a 6-parameter affine model, the parameters of the affine model can be shown in equation (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad \text{Eq. (11)}$$

where $(v_{0x}, v_{0y})$, $(v_{1x}, v_{1y})$, $(v_{2x}, v_{2y})$ can be a top-left control point motion vector, a top-right control point motion vector, and a bottom-left control point motion vector respectively, and w and h can be a width and a height of the CU respectively.

Step (4): finally, the luma prediction refinement $\Delta I(i,j)$ can be added to the subblock prediction $I(i,j)$. A final prediction $I'$ can be generated as shown in equation (12).

$$I'(i,j) = I(i,j) + \Delta I(i,j) \qquad \text{Eq. (12)}$$

In some embodiments, PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

Affine Motion Estimation (ME), such as in VVC reference software VTM, can be operated for both Uni-prediction and Bi-prediction. The Uni-prediction can be performed on one of a reference list L0 and a reference list L1 and the Bi-prediction can be performed on both the reference list L0 and the reference list L1.

Figure 15:
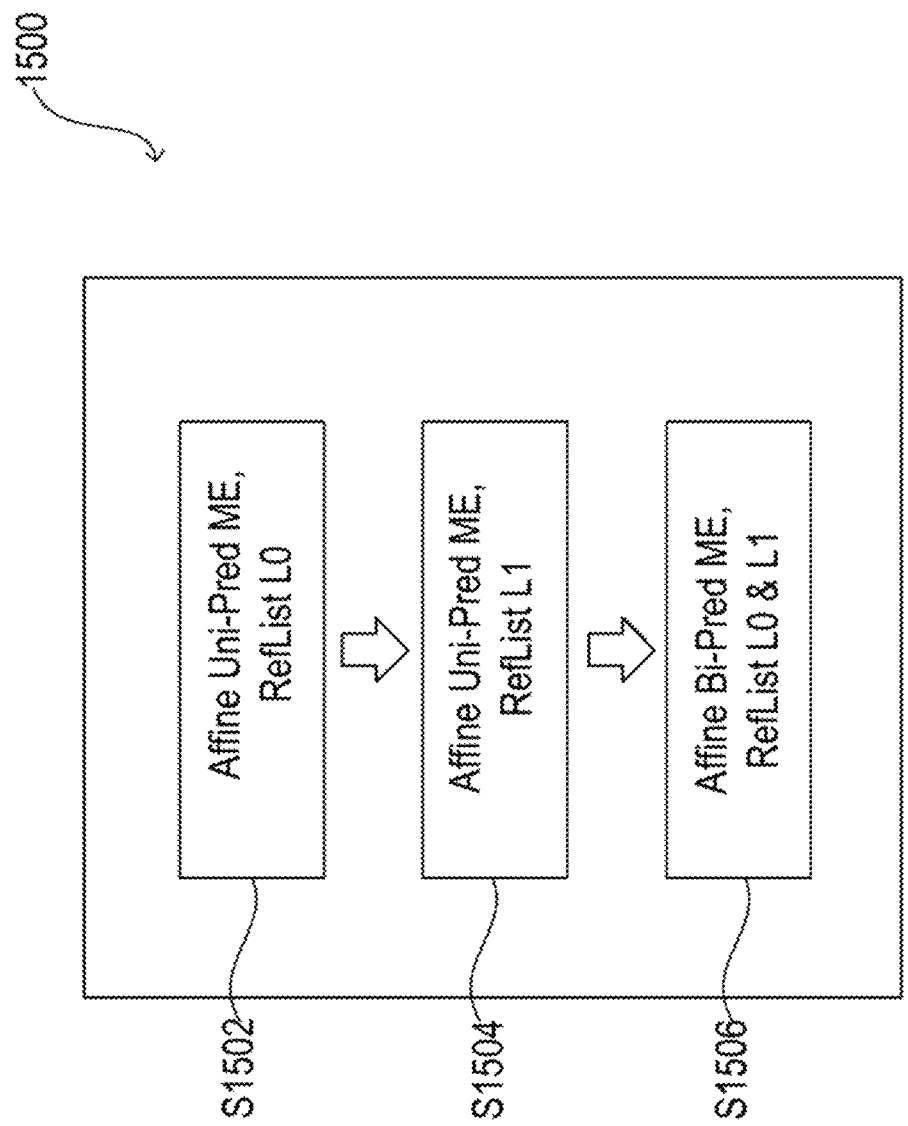
FIG. 15 shows an exemplary schematic illustration of an affine motion estimation process.

FIG. 15 shows a schematic illustration of affine ME (1500). As shown in FIG. 15, in affine ME (1500), an affine Uni-prediction (S1502) can be performed on the reference list L0 to obtain a prediction P0 of a current block based on an initial reference block in the reference list L0. An affine Uni-prediction (S1504) can also be performed on the reference list L1 to obtain a prediction P1 of the current block based on an initial reference block in the reference list L1. At (S1506), an affine Bi-prediction can be performed. The affine Bi-prediction (S1506) can start with an initial prediction residue (2I-P0)-P1, where I can be initial values of the current block. The affine Bi-prediction (S1506) can search for candidates around the initial reference block in the reference list L1 to find a best (or selected) reference block that has a minimum prediction residue (2I-P0)-Px, where Px is a prediction of the current block based on the selected reference block.

With a reference picture, for a current coding block, the Affine ME process can first pick a set of control point motion vectors (CPMVs) as a base. An iterative method can be used to generate a prediction output of a current affine model that corresponds to the set of CPMVs, calculate gradients of prediction samples, and then solve a linear equation to determine delta CPMVs to optimize affine prediction. The iterations can stop when all the delta CPMVs are 0, or a maximum number of iterations is reached. The CPMVs obtained from the iterations can be final CPMVs for the reference picture.

After the best affine CPVMs on both the reference list L0 and L1 are determined for affine Uni-prediction, affine Bi-prediction searching can be performed by using the best Uni-prediction CPMVs and a reference list on one side and searching for best CPMVs on the other reference list to optimize affine Bi-prediction output. The affine Bi-prediction search can be performed iteratively on the two reference lists to obtain optimal results.

Figure 16:
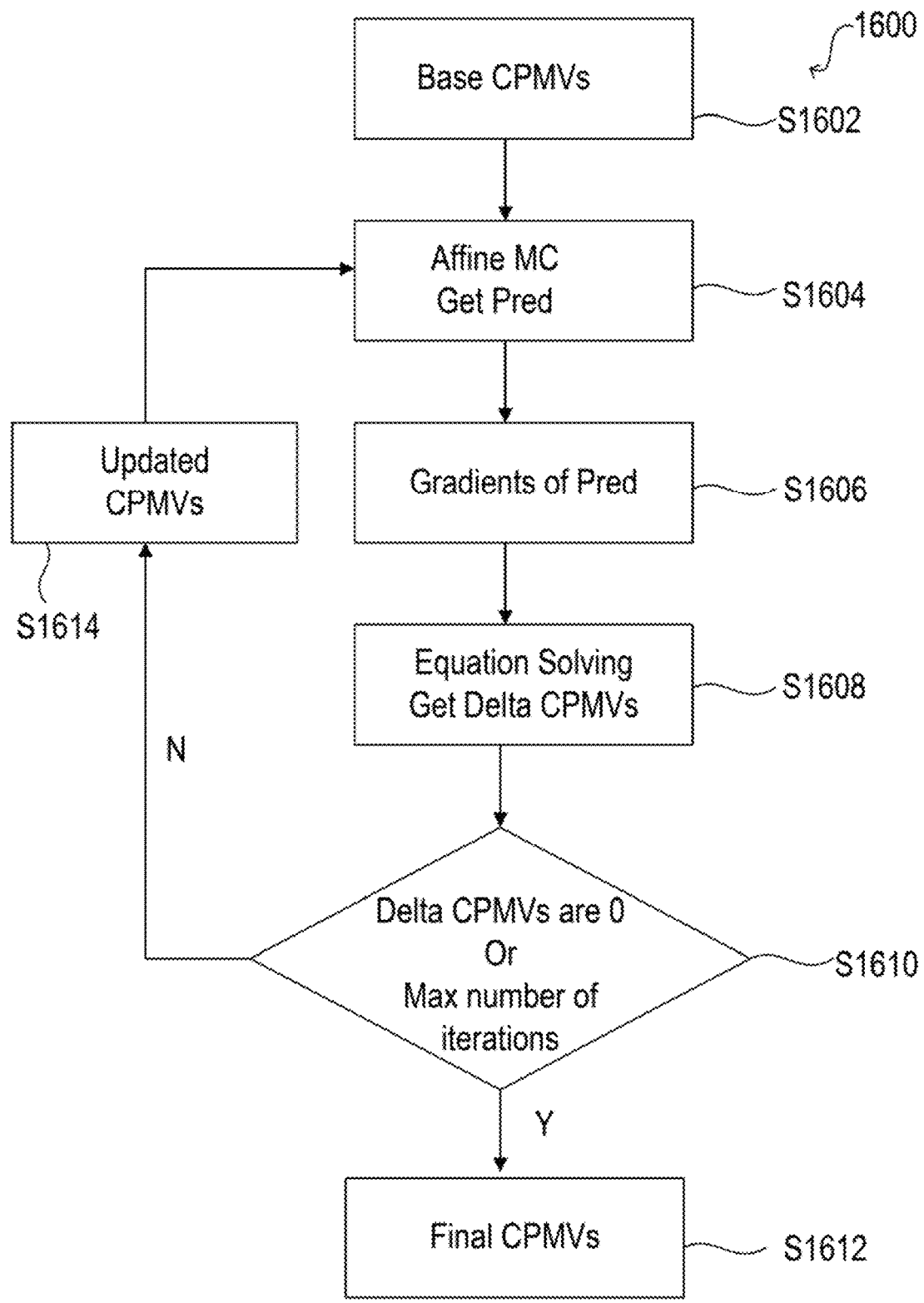
FIG. 16 shows an exemplary flow chart of affine motion estimation search.

FIG. 16 shows an exemplary affine ME process (1600) in which final CPMVs associated with a reference picture can be calculated. The affine ME process (1600) can start with (S1602). At (S1602), base CPMVs of a current block can be determined. The base CPMVs can be determined based on one of a merge index, an advanced motion vector prediction (AMVP) predictor index, an affine merge index, or the like.

At (S1604), an initial affine prediction of the current block can be obtained based on the base CPMVs. For example, according to the base CPMVs, a 4-parameter affine motion model of a 6-parameter affine motion model can be applied to generate the initial affine prediction.

At (S1606), gradients of the initial affine prediction can be obtained. For example, the gradients of the initial affine prediction can be obtained based on equations (5) and (6).

At (S1608), delta CPMVs can be determined. In some embodiments, the delta CPMVs can be associated with a displacement between the initial affine prediction and a subsequent affine prediction, such as a first affine prediction. Based on the gradients of the initial affine prediction and the delta CPMVs, first affine prediction can be obtained. The first affine prediction can correspond to first CPMVs.

At (S1610), a determination can be made to check whether the delta CPMVs are zero or an iteration number is equal to or larger than a threshold value. When the delta CPMVs are zero or the iteration number is equal to or larger than the threshold value, final (or selected) CPMVs can be determined at (S1612). The final (or selected) CPMVs can be the first CPMVs that are determined based on the gradients of the initial affine prediction and the delta CPMVs.

Still referring to (S1610), when the delta CPMVs are not zero or the iteration number is less than the threshold value, a new iteration can start. In the new iteration, updated CPMVs (e.g., the first CPMVs) can be provided to (S1604) to generate an updated affine prediction. The affine ME process (1600) can then proceed to (S1606), where gradients of the updated affine prediction can be calculated. The affine ME process (1600) can then proceed to (S1608) to continue the new iteration.

Motion Compensated Temporal Filtering (MCTF) may be used as a preprocessing tool in various encoders. For example, VTM (VVC reference software) can use a temporal filter (TF) to increase similarity between a current frame and neighbor frames of the current fame so that residual information can be reduced. The term TF frame can be used to denote a frame to be filtered by the temporal filter. TF can be applied for each picture at an interval POC of 16 or 8. Up to 4 references in a forward and a backward direction can be used to derive a weight for bilateral filtering. Original samples of TF frames at a kth spatial location can be filtered as described in equation (13)

$$I_n(k) = \frac{I_o(k) + \sum_{i=0}^{7} w_r(i, a, k) I_r(i, k)}{1 + \sum_{i=0}^{7} w_r(i, a, k)} \quad \text{Eq. (13)}$$

where, $I_n(k)$ and $I_o(k)$ can represent a filtered pixel (or filtered pixel value) and an original pixel (or original pixel value) of a pixel i in a current picture at a spatial location k, respectively. k can be the location of the pixel i in the current picture. $I_r(i,k)$ can denote a collocated pixel (or collocated pixel value) in a neighboring picture $I_r$ for the pixel i in the current picture. The collocated pixel can also be located at a kth spatial location of the neighboring picture $I_r$ which is at a rth motion compensated reference frame. The neighboring picture $I_r$ can be derived by performing motion estimation and then motion compensation from the reference frame r to the current TF picture. A weight for each reference (or pixel) i in a number of available reference pictures at the spatial location k, $w_r(i,a,k)$, can be derived as follows in equation 14) for a luma sample:

$$w_r(i, a, k) = bw \cdot s_o \cdot s_r(i, a) \cdot e^{-\frac{\Delta I(i,k)^2}{sw \cdot \sigma_i(QP)^2}} \quad \text{Eq. (14)}$$

where, bw=0.4 stands for a base weight, $s_0$ is a basic filter strength decided by an interval POC as described in equation (15)

$$s_0 = \begin{cases} 1.50 & \text{if } POC \% 16 = 0 \\ 0.95 & \text{if } POC \% 8 = 0 \end{cases} \quad \text{Eq. (15)}$$

A reference filter strength, $s_r(i,a)$, can be defined by a look up table depending on whether references are available in both directions (a=8 references) or one direction (a=4 references). $s_r(i,a)$ can be described in equation (16) as follows:

$$s_r(i, 4) = \begin{cases} 1.13 \\ 0.97 \\ 0.81 \\ 0.57 \end{cases}, \text{ and } s_r(i, 8) = \begin{cases} 0.33 \\ 0.41 \\ 0.57 \\ 0.85 \\ 0.85 \\ 0.57 \\ 0.41 \\ 0.33 \end{cases} \quad \text{Eq. (16)}$$

$\Delta I(i,k)$ can represent a pixel difference between the original pixel at the spatial location k and the collocated pixels of the original pixel if the original pixel is at a ith reference picture. sw can denote a sigma base weight of 2. $\sigma_i(QP)=3*(QP-10)$ when QP is a slice QP. The base weight bw and the sigma weight sw can further be adjusted adaptively for each 8×8 block based on a block error and a simple block frequency weighting.

Scene cut detection may include a technique for detecting whether an abrupt scene transition occurs, for example when content changes from one scene to another scene. A scene change can result in a significant change in content, and can detected for example by evaluating a difference between temporally neighboring pictures.

Flash detection may include a technique for detecting whether one or more pictures are significantly different from other pictures in a sequence of pictures of one scene, such as due to a camera flash, or insertion of picture(s) during video editing. The flash detection can be performed in a similar way as scene cut detection, for example. Flash detection may be performed to determine whether past and future neighboring frames belong to a same scene.

Figure 17:
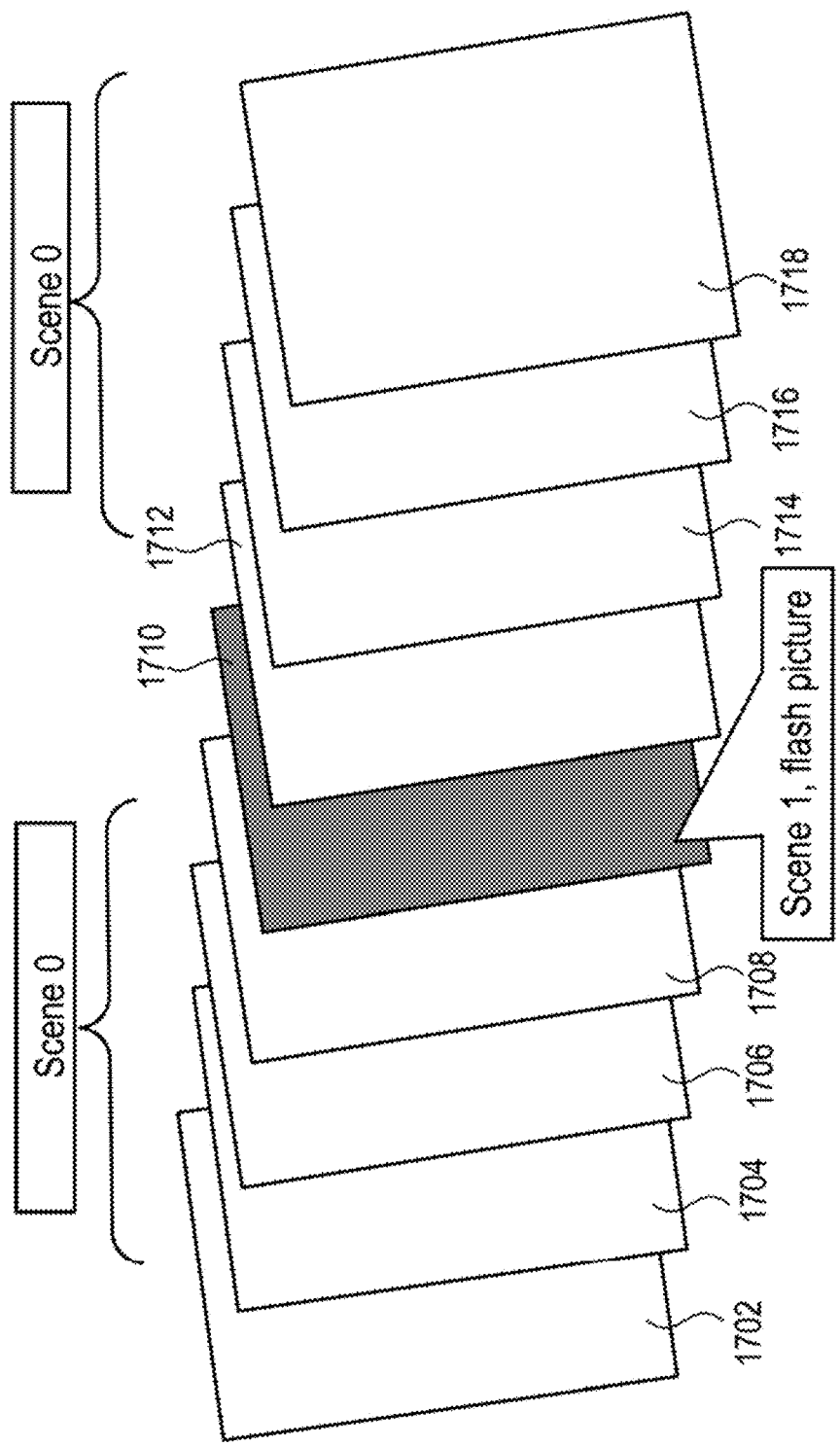
FIG. 17 shows an exemplary schematic illustration of a flash picture detection.

FIG. 17 shows a schematic illustration of an example of flash picture detection. As shown in FIG. 11, a sequence of pictures including pictures (1702), (1704), (1706), (1708), (1710), (1712), (1714), (1716), and (1718) can be provided. The picture (1710) in the sequence of pictures can be detected as a flash picture when the picture (1710) belongs to a first scene (e.g., scene 1), and the pictures (1702), (1704), (1706), and (1708) that are prior to the picture (1710) and the pictures (1712), (1714), (1716), and (1718) that are subsequent to the picture (1710) belong to a second scene (e.g., scene 0).

Fade detection can include a technique to detect whether a group of consecutive pictures are in the middle of a gradual transition from one scene to another. Some special cases may include transitioning into or out of a blank picture with one color, such as black or white. A histogram of pictures can be utilized to perform the fade detection.

Noise estimation can include a common technique in image processing, where a noise level can often be estimated via evaluating a gradient energy of a picture. Local contents like edges, smooth areas, or textures can be further utilized to derive the noise level with a higher accuracy.

Figure 18:
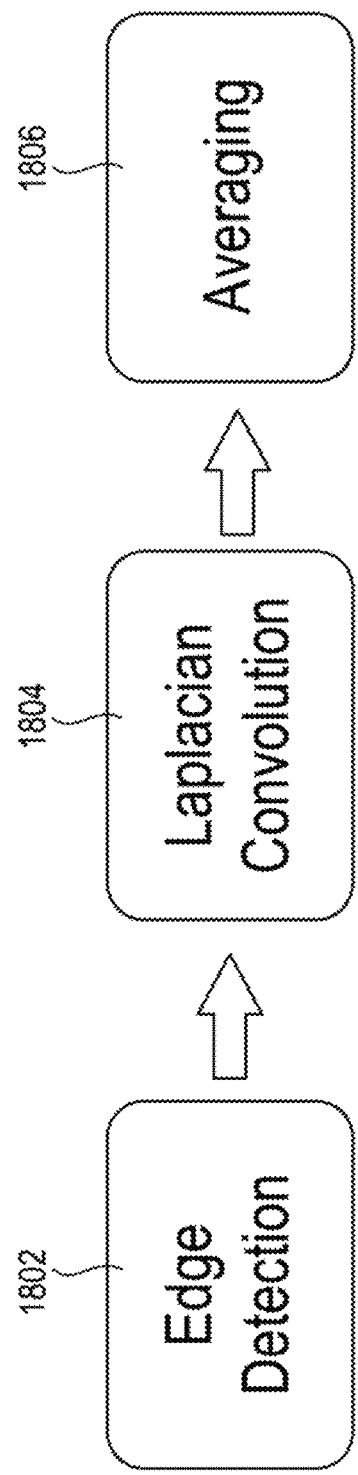
FIG. 18 shows an exemplary schematic illustration of a noise detection process.

In an example, a noise detection process can be shown in FIG. 18. As shown in FIG. 18, at (1802), a Sobel operation can be used for edge detection to exclude edges from noise detection.

According to the Sobel operation, a current picture can be denoted as I(x,y), where (x,y) is a coordinate of a pixel. An output of the Sobel operator can be described in equation (17) as follows:

$$G = \left| I(x, y) * \begin{bmatrix} -1 & -2 & -1 \\ 0 & 0 & 0 \\ 1 & 2 & 1 \end{bmatrix} \right| + \left| I(x, y) * \begin{bmatrix} -1 & 0 & 1 \\ -2 & 0 & 2 \\ -1 & 0 & 1 \end{bmatrix} \right| \quad \text{Eq. (17)}$$

where |·| defines an absolute operator. An edge map can be determined using a threshold $G_{th}$ for G. At (1804), pixels with $G<G_{th}$ can be used in the noise detection with a Laplacian operator. At (1806), a noise level calculation can be described in equation (18).

$$\sigma = \sqrt{\frac{\pi}{2}} \frac{1}{6(W-2)(H-2)} \sum_{x,y} |I(x, y) * N| \quad \text{Eq. (18)}$$

where N can be a Laplacian operator according to equation (19).

$$N = \begin{bmatrix} 1 & -2 & 1 \\ -2 & 4 & -2 \\ 1 & -2 & 1 \end{bmatrix} \quad \text{Eq. (19)}$$

Sample content, such as a blank screen, can be easily detected for a block with B×B pixels by comparing a pixel variance and/or a pixel value range (e.g., max_pixel_val–min_pixel_val).

To reduce computational complexity, down-sampled pictures can be used for pre-analysis of a video sequence in video encoders. In an example, a pre-analysis picture can be down sampled with a 1:2 ratio both vertically and horizontally from an original full-sized picture, which can result in a down-sampled pre-analysis picture with ¼ of the number of pixels as in the original picture.

In some cases, the down-sampled pictures can be stored along with the original picture, for example until the original picture is no longer needed in the encoding process.

ME can be applied in a pre-analysis stage to find MVs that are used for other pre-analysis modules, such as an inter cost estimation, a motion compensated temporal filtering, or the like.

A motion estimation in pre-analysis (or a pre-analysis stage) can be implemented in a similar way to a motion estimation process in an encoder. In an example, the motion estimation in pre-analysis can be performed on down-sampled pictures, such as a down-sampled current picture that is down sampled from a current picture and one or more reference pictures of the current picture.

A motion estimation of a down-sampled current picture and a reference picture of the current picture may start from an initial motion vector value. In an example, the initial motion vector can be a zero motion vector (e.g., a motion vector with both a horizontal component and a vertical component with a value of 0). In an example, the initial motion vector can be set as a motion vector predictor (MVP) derived from neighboring blocks, which can be shown in FIG. 19.

Figure 19:
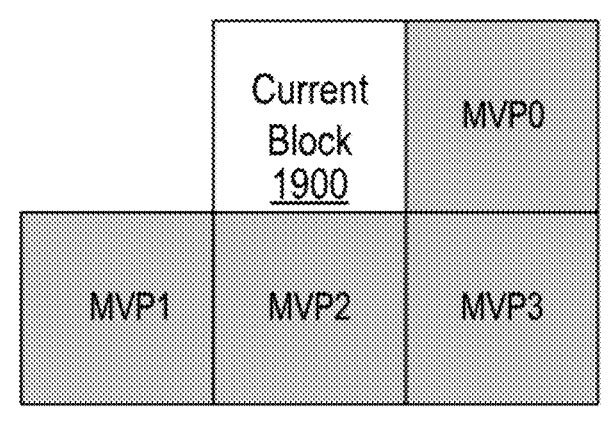

As shown in FIG. 19, ME can be implemented in multiple stages. For example, a current block (1900) can have a plurality of MVP candidates, such as MVP0-MVP3, that are derived from neighboring blocks of the current block (1900). A best (or selected) MVP can first be selected from the plurality of MVP candidates (e.g., MVP0-MVP3) based on a lowest cost. A cost can be determined based on a SAD (sum of absolute difference) or a SATD (sum of absolute transformed difference) between the current block (1900) and a reference block pointed by a motion vector value of a MVP of the plurality of MVP candidates. Then a full pixel (full-pel) motion estimation search can be performed in a predefined range in a reference picture. Various search methods can be used for the ME search, such as a Hexagon search, a Full search, a N-stage full search, a diamond search, etc. One or a combination of multiple ME search methods can also be used.

After the full-pel search is finished, a MV value with a best cost can be selected, and the MV may be used as a base MV for a sub-pixel MV refinement. According to a precision requirement, a half-pel refinement, a quarter-pel refinement, and/or ¹⁄₁₆-pel refinement, or the like, can be applied. The MV refinement may also be done in multiple stages. For example, the MV refinement can start with a lower precision and proceed to a higher precision in a next stage, until a target precision is achieved.

After the MV refinement stage(s), a final MV is determined. In pre-analysis, the final MV can be used by the current block for a motion compensation (MC) and/or an inter-picture prediction (or an inter prediction) cost estimation.

Figure 20:
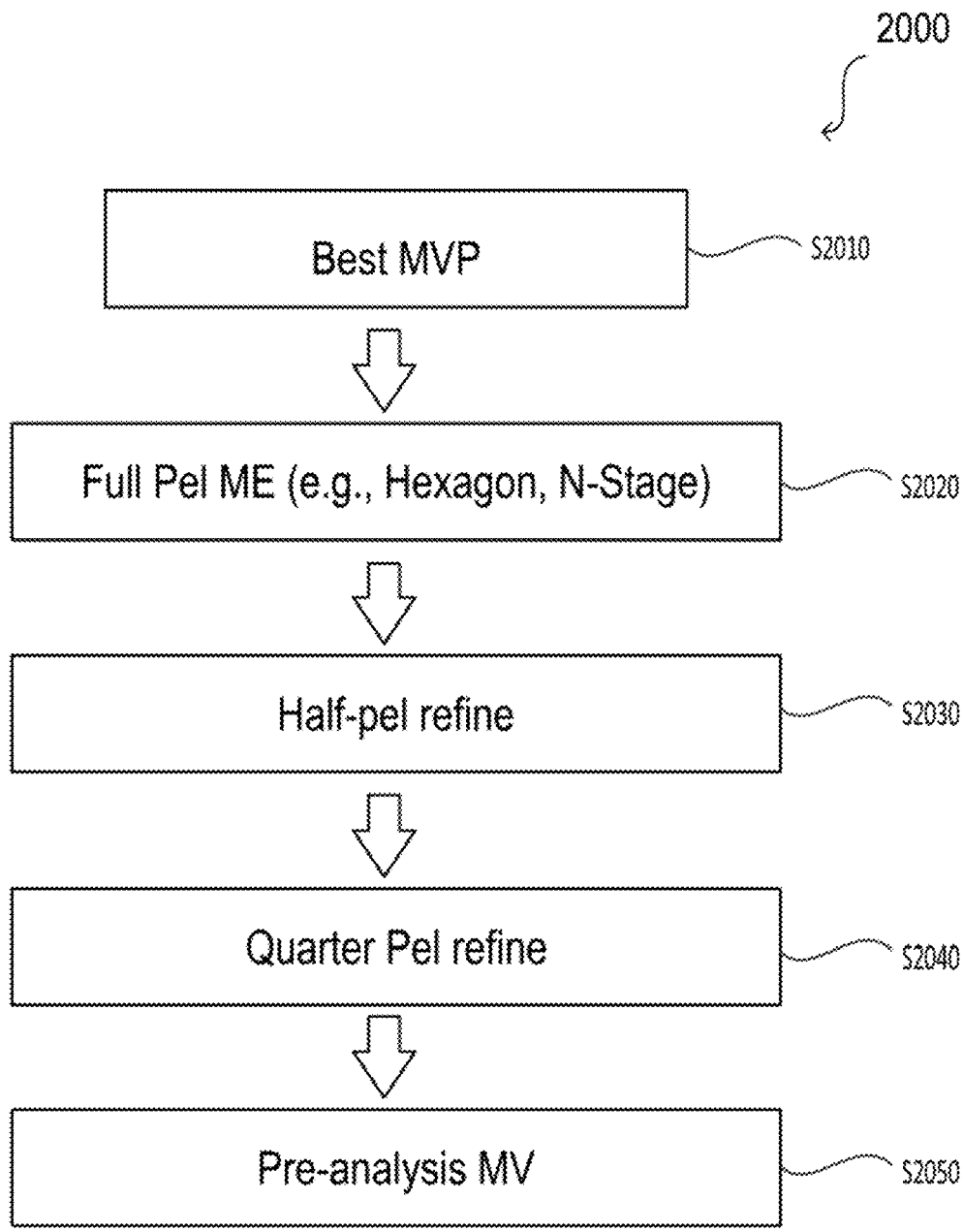
FIG. 20 shows a flow chart of an exemplary multi-stage motion estimation.

FIG. 20 shows an exemplary process (2000) to operate a muti-stage motion estimation. As shown in FIG. 20, the process (2000) can start with (S2010), where a best (or selected) MVP can be determined. For example, the best MVP can be determined from a plurality of MVP candidates, such as MVP0-MVP3 in FIG. 19, based on a lowest cost.

At (S2020), a full pixel ME search can be performed to determine a MV with a best (or lowest) cost. The full pixel (or full-pel) ME search can be performed in a predefined range in a reference picture based on a search method, such as a Hexagon search, a Full search, a N-stage full search, a diamond search, or the like.

At (S2030), the MV determined at (S2020) can be used as a base MV for a sub-pixel MV refinement, such as a half-pel refinement.

At (S2040), the base MV that is refined at (S2030) can further be refined based on a quarter-pel refinement to generate a final MV.

At (S2050), the final MV can be used in a pre-analysis stage by the current block for a MC and/or an inter-picture prediction (or an inter prediction) cost estimation.

Although an affine MC and related coding tools of the affine MC can provide improvements to coding efficiency, the affine MC can also increase a computational complexity, such as in an affine motion estimation.

In the disclosure, affine estimation (or affine motion estimation) or affine detection can be applied in a pre-analysis stage. To improve coding efficiency and reduce computational complexity, the pre-analysis stage can include one or more preprocessing processes (e.g., an affine ME, a motion compensated temporal filtering (MCTF), or a down sampling) that are applied to a current block or a current picture to generate pre-analysis information. The pre-analysis information can further be applied when the current block or the current picture is encoded by the encoder to generate prediction information of the current block or prediction information of the current picture. In an example, an affine ME can be performed on a current block of a current picture to determine pre-analysis affine parameters of the current block in the pre-analysis stage. The pre-analysis affine parameters can be stored with the current block. An affine prediction can further be performed on the current block based on the stored pre-analysis affine parameters to generate prediction information of the current block.

In an embodiment, an affine ME can be applied on a down-scaled (or down-sampled) version of a current picture and down-scaled reference pictures of the current picture in a pre-analysis stage/a lookahead buffer to reduce a complexity of the affine ME operations.

In an embodiment, the affine motion estimation in the pre-analysis stage can use simplified configurations compared to an affine ME that is applied by an encoder to generate prediction information of a current block, such as the affine ME process (1600) provided in FIG. 16. For example, the simplified configuration may include only applying the pre-analysis affine ME to certain prediction types, without certain processes, and/or a reduced number of search iterations.

In an example, the pre-analysis affine ME may only be applied for affine uni-predictions. Thus, the affine ME performed in the pre-analysis stage can be operated based on a reference picture in a reference list.

In an example, the pre-analysis affine ME may be done without a PROF process. Accordingly, a prediction refinement with optical flow may not be used when the affine ME is performed in the pre-analysis stage.

In an example, the pre-analysis affine ME may have a smaller maximum number of gradient-based search iterations. In an example, the maximum number of iterations can be set as 1. Thus, as shown in FIG. 16, final CPMVs can be derived based on base CPMVs through a single iteration.

In an embodiment, the affine motion estimation can be applied for a pre-defined fixed block size in the pre-analysis stage. Thus, the affine ME in the pre-analysis stage can be applied to a block with the pre-defined fixed block size to derive affine parameters associated with the block. The affine parameters that are derived based on the affine ME can further be stored at the fixed block size level. A pre-analysis affine flag can further be stored for the block to indicate whether an affine mode associated with the affine parameters has a best (or minimum) cost in a pre-analysis inter cost estimation. For example, when the flag is true, the flag can indicate that a cost value of the block that is determined based on the affine parameters of the affine mode is less than a total cost value of subblocks of the block. The stored affine parameters can further be applied as a starting point in another affine ME, such as the other affine ME in FIG. 16, to generate final CPMVs. In an example, the final CPMVs can be used as an affine motion to generate prediction samples of the block. In an example, the final CPMVs can function as an affine motion predictor for the block.

In an example, the fixed block size can be 64×64 luma samples. The size of 64×64 luma samples can refer to a block size in a full resolution picture (e.g., in a current picture with a full resolution). When a 2:1 down-sampling is applied for pre-analysis pictures, an actual block size applied to an affine ME search in a down-sampled picture can be 32×32 luma samples. The affine parameters can further be stored for each of the searched blocks.

In an example, the fixed block size can be 32×32 luma samples. The size of 32×32 luma samples can refer to a block size in a full resolution picture (e.g., in a current picture with a full resolution, or a reference picture with a full resolution). When a 2:1 down-sampling is applied for pre-analysis pictures, an actual block size applied to the affine ME search in a down-sampled picture can be 16×16 luma samples. The affine parameters are further be stored for each of the searched blocks.

In an example, affine parameters that are derived by the affine ME applied on a block in a pre-analysis stage may only be stored under certain conditions, such as when a pre-analysis flag associated with block is true. Thus, according to the flag being true, the affine parameters can have a best (or minimum) cost in a pre-analysis inter cost estimation.

In an embodiment, an affine motion estimation may be applied only for block sizes above a certain threshold. Affine parameters or affine control point motion vectors derived based on the affine ME in a pre-analysis stage can be stored at a minimum block size level according to the threshold. For example, the affine parameters or the affine control point motion vectors derived based on the affine ME in the pre-analysis stage can be stored at a block size level equal to the threshold. In an example, the threshold can be 64×64 luma samples or 32×32 luma samples.

In an example, a pre-analysis affine ME can be applied only for blocks with a size equal to or larger than a threshold. For example, the pre-analysis affine ME can be applied only for blocks with a size equal to 64×64 or above. The size can correspond to a block size in full resolution pictures. In another example, the pre-analysis affine ME can be applied only for blocks with a size qual to 32×32 and above. The size can correspond to a block size in full resolution pictures.

In an example, at a grid (e.g., an area of a block or a basic pre-analysis unit) of a minimum pre-analysis affine ME block size, a pre-analysis affine flag can be stored at the grid level. Thus, a pre-analysis affine flag can be stored with a grid of a block with a minimum pre-analysis affine ME block size.

In an example, at a grid of a minimum pre-analysis affine ME block size, when a pre-analysis affine flag is true, an affine block size (e.g., a block size of a block that receives the pre-analysis affine ME) and affine parameters derived by the affine ME in the pre-analysis stage can be stored.

In an embodiment, affine control point motion vector predictors can be generated first. The affine control point motion vector predictors can be used as a starting point for a pre-analysis affine ME.

In an example, a pre-analysis translational ME can be performed first on a block before an affine ME is applied in a pre-analysis stage. Based on an iterative search of the translational ME, a best (or selected) translational MV can be generated. The translational ME can be performed based on a bi-prediction process or a uni-prediction process. The best (or selected) translational MV can be used as a starting point (or base CPMVs) for the affine ME in a pre-analysis stage, such as the base CPMVs shown in FIG. 16.

In an example, MVs (or translational MVs) from a pre-analysis translational ME on smaller block sizes can be averaged to generate an average MV. The average MV can be used as a starting point of an affine ME in the pre-analysis stage. For example, the affine ME can be performed on a current block that has a block size of 64×64 luma samples. The current block can have 4 subblocks with a block size of 16×16 luma samples. A translation ME can be applied on each subblock to generate a respective translational MV. The translational MVs of the subblocks can be averaged to generate an average MV. The average MV can further be used as a starting point of the affine ME in the pre-analysis stage for the current block.

In an example, a pre-analysis translational ME can be applied on smaller block sizes (e.g., subblocks of a current block) first. Thus, each of the internal small blocks (or each of the subblocks) next to a control point of the current block can have a respective translational MV. The respective translational MV can be used as a control point motion vector. The control point motion vectors can be used to generate a set of CPMVs as a starting point of the affine ME. For example, as shown in FIG. 10, a current block (1000) can include a plurality of subblocks, such as subblocks (1004) and (1006). The subblocks (1004) and (1006) can be adjacent to a control point (1010) of the current block (1000). A translational MV (1002) of the subblock (1004) and a translational MV (1008) of the subblock (1006) can generate a set of CPMVs. The set of CPMVs can further be used as a starting point (or base CPMVs) for the affine ME in the pre-analysis stage.

In an example, a constructed affine predictor can be used to construct an affine CPMV predictor from pre-analysis translational MVs of the neighboring blocks of a current block. Thus, the constructed affine predictor of the current block can be determined based on the pre-analysis translational MVs of the neighboring block. The constructed affine predictor can further be used to determine a starting point (or base CPMVs) for the affine ME in the pre-analysis stage.

In an example, an affine model inheritance can be used to inherit an affine model. The affine model can be inherited from a neighboring block of a current block. The inherited affine model can further be used for the affine ME in the pre-analysis stage. For example, as shown in FIG. 12, an affine model of a neighboring block (1202) of a current block (1204) can be inherited. The inherited affine model can further be used for an affine ME of the current block (1204).

In the disclosure, an affine parameter storage can be applied in a pre-analysis stage. Affine parameters can be stored for pre-analysis pictures when a pre-analysis affine ME is finished. The storage of affine parameters can be implemented for each block for which the affine ME is performed in the pre-analysis stage.

In an embodiment, the affine parameters can only be stored for a block when a pre-analysis affine flag associated with the block is set as true. In an example, when the pre-analysis flag associated with block is true, the flag indicates that the affine parameters have a best (or minimum) cost in a pre-analysis inter cost estimation.

In an embodiment, affine parameters that are derived by a pre-analysis affine ME can be stored for a block, no matter whether a pre-analysis affine flag is set as true or false.

In an embodiment, stored affine parameters of the pre-analysis affine ME can be control point motion vector values.

In an embodiment, stored affine parameters can be parameters of affine model equations.

In an example, for a 4-parameter affine motion model, parameters a, b, c, and f can be stored. As shown in equations (20) and (21), a 4-parameter affine motion model can be provided. A motion vector at a sample location (x,y) in a block can be derived as follows in equation (20):

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad \text{Eq. (20)}$$

Equation (20) can also be described as follows in equation (21).

$$\begin{cases} mv_x = ax + by + c \\ mv_y = -bx + ay + f \end{cases} \quad \text{Eq. (21)}$$

where the parameters a, b, c, and f of the 4-parameter affine motion model can be stored.

In an example, for a 6-parameter affine motion model, parameters a, b, c, d, e, and f can be stored. As shown in equations (22) and (23), a 6-parameter affine motion model can be provided. A motion vector at a sample location (x,y) in a block can be derived as follows in equation (22):

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. (22)}$$

Equation (22) can also be described as follows in equation (23):

$$\begin{cases} mv_x = ax + by + c \\ mv_y = dx + ey + f \end{cases} \quad \text{Eq. (23)}$$

where the parameters a, b, c, d, e, and f of the 6-parameter motion model can be stored.

In an example, affine parameters of the pre-analysis affine ME can be stored with a precision of N bits integer. In an example, N can be equal to 32. In an example, N can be equal to 16.

In an example, a workflow of a pre-analysis affine motion estimation with a reference picture can be provided as follows in steps (a)-(d). For simplicity and clarity, the pre-analysis affine ME can be applied to a current block with a size of N×N luma samples.

At step (a), an affine CPMV predictor (or an initial predictor) can be generated as a current CPMV, such as base CPMVs shown in FIG. 16. The base CPMVs can be generated based on one of a merge index, an advanced motion vector prediction (AMVP) predictor index, and an affine merge index. The base CPMVs can also be generated based on a pre-analysis translational ME that is applied on the current block.

At step (b), an affine motion estimation can be applied on the N×N block (or current block). In an example, the step (b) can be provided in the flow chart shown in FIG. 16. For example, an affine motion compensation can be performed using the current CPMV to generate an initial predictor P0. A vertical gradient and a horizontal gradient of the initial predictor P0 of the N×N block can be determined. A difference between the initial affine prediction P0 and the current block can be determined. A gradient-based affine parameter optimization can be applied to generate delta MV values for each of control points associated with the current block. The delta MV values can be applied to the current CPMV (e.g., base CPMVs) to get a new CPMV. When the delta MV values are not zero and/or a maximum number of iterations of the gradient-based search is not reached, a next iteration can be performed based on the new CPMV. Otherwise, the new CPMV can be determined as a final affine CPMV for the current block.

At step (c), a cost of the current block can be calculated based on an affine motion compensation using the final affine CPMV. For example, prediction samples of the current block can be determined based on the final affine CPMV. The cost of the current block can be determined based on a difference between the prediction samples and the current block.

At step (d), a total best (or selected) cost of all pre-analysis blocks within the current pre-analysis affine block size (or a total best cost of subblocks of the current block) can be calculated. The cost of each pre-analysis block (or subblock) can include a translation MV based inter cost and/or an intra cost. When the affine cost of the current block is lower than the total best (or selected) cost of all pre-analysis blocks within the current pre-analysis affine block size, a pre-analysis affine flag can be set as true, and the final affine parameters for the current block can be stored. Otherwise, the pre-analysis affine flag can be set as false.

In the disclosure, pre-analysis affine information (e.g., affine parameters) that is derived from a pre-analysis affine ME can be utilized for an encoding process, such as an affine prediction, that is applied to a current block. For example, the pre-analysis affine information can be used to assist an encoder to achieve a better coding efficiency or a faster encoding speed.

In an embodiment, pre-analysis affine information that is stored can be used to determine whether a motion estimation search prior to an affine ME can be skipped. For example, the stored pre-analysis affine information can be used to determine whether a translational ME search can be skipped.

In an example, when a current block corresponds to a pre-analysis block size (e.g., the current block is a block that received a pre-analysis affine ME), and a pre-analysis affine flag associated with the current block is set as true, a translation ME for the current block can be skipped. Accordingly, the translational ME search can be skipped by an encoder and the encoder can proceed to an encoding process, such as an affine ME, directly.

In an embodiment, when a current block corresponds to a pre-analysis block size, and a pre-analysis affine flag of the current block is set as true, stored affine parameters associated with the current block can be used as affine parameters for the current block in an affine prediction process. If the pre-analysis was done on a down-sampled picture size, a precision conversion can be applied on the affine parameters before the affine parameters are applied to the current block.

In an embodiment, pre-analysis affine parameters can be used to assist an affine ME in an encoder for a current block.

In an example, the affine parameters of a corresponding pre-analysis block (e.g., a current that received a pre-analysis affine ME) can be used as an affine ME starting point (e.g., base CPMVs) after necessary conversions (e.g., resolution conversions). Based on the affine ME starting point, another affine ME can be applied to the current block to generate prediction samples of the current block.

In an embodiment, pre-analysis affine parameters can be used to assist an affine merge candidate assessment in an encoder.

In an example, affine parameters of a corresponding pre-analysis block with necessary conversions (e.g., resolution changes) can be used to skip an affine merge candidate which correspond to a delta larger than a threshold. The delta can be determined between affine parameters of the affine merge candidate and the stored affine parameters that are derived in the pre-analysis affine ME.

Figure 21:
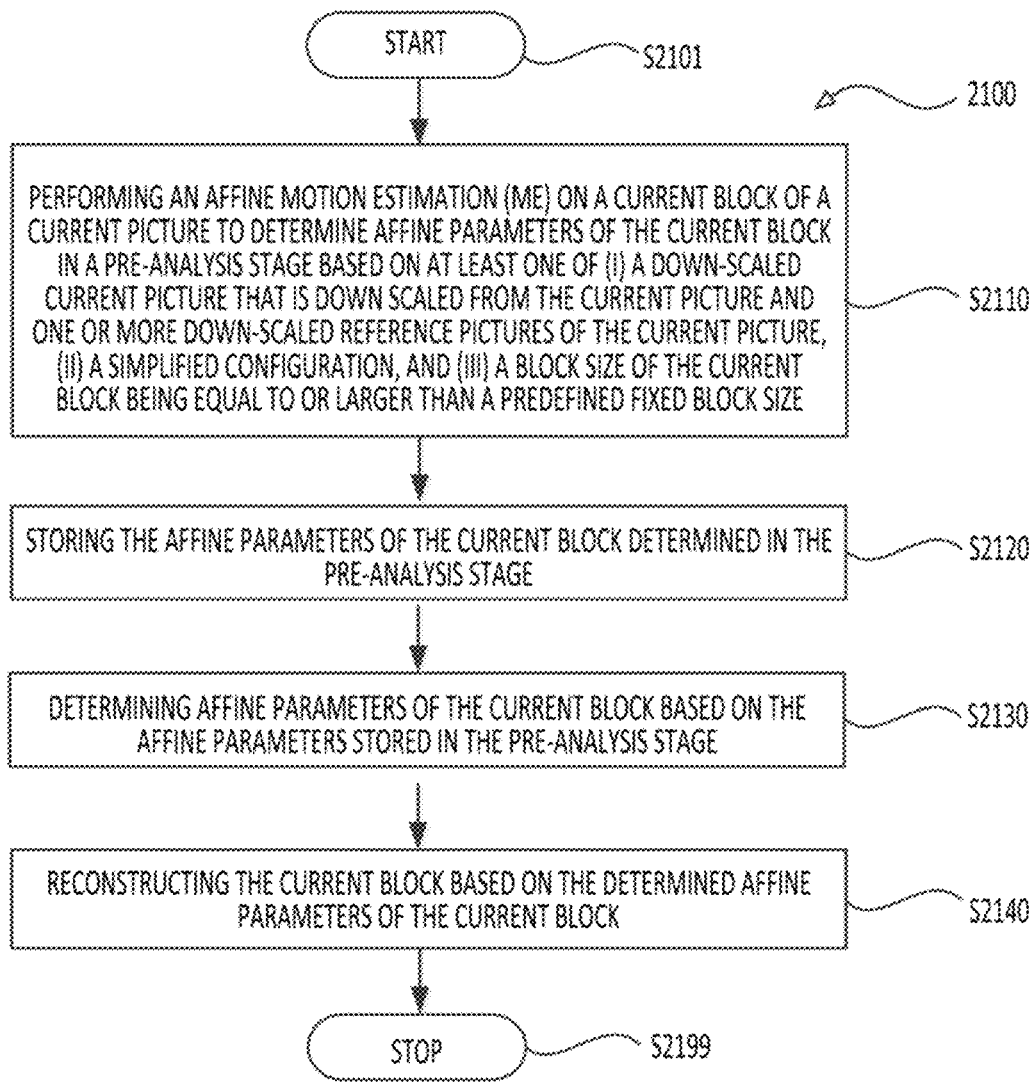
FIG. 21 shows a flow chart outlining an exemplary encoding process according to some embodiments of the disclosure.

FIG. 21 shows a flow chart outlining an exemplary encoding process (2100) according to some embodiments of the disclosure. The process (2100) can be implemented by processing circuitry (e.g., one or more processors or one or more integrated circuits). In one example, the one or more processors execute a program that is stored in a non-transitory computer-readable medium.

The process (e.g., (2100)) can be used in the encoding of a block, so as to generate a prediction block for the block. In various embodiments, the process (e.g., (2100)) is executed by processing circuitry, such as the processing circuitry in the terminal devices (310), (320), (330) and (340), the processing circuitry that performs functions of the video encoder (403), the processing circuitry that performs functions of the video encoder (603), and the like. In some embodiments, the process (e.g., (2100)) is implemented in software instructions, thus when the processing circuitry executes the software instructions, the processing circuitry performs the process (e.g., (2100)).

As shown in FIG. 21, the process (2100) can start from (S2101) and proceed to (S2110). At (S2110), an affine ME is performed on a current block of a current picture to determine affine parameters of the current block in a pre-analysis stage. The affine ME is performed based on at least one of (i) a down-scaled current picture that is down scaled from the current picture and one or more down-scaled reference pictures of the current picture, (ii) a simplified configuration, or (iii) a fixed block size of the current block being equal to or larger than a threshold.

At (S2120), the affine parameters of the current block determined in the pre-analysis stage are stored.

At (S2130), affine parameters of the current block are determined based on the affine parameters stored in the pre-analysis stage.

At (S2140), the current block is reconstructed based on the determined affine parameters of the current block.

In some embodiments, the affine parameters of the current block determined in the pre-analysis stage are stored in response to a cost value of the current block being less than a total cost value of subblocks of the current block. A flag that indicates whether the cost value of the current block is less than the total cost value is stored.

To perform the affine ME based on the simplified configuration, the affine ME is performed based on a uni-prediction in which one of the one or more down-scaled reference pictures is applied. The affine ME is performed without a PROF process. The affine ME is performed with a reduced iteration number.

In some embodiments, the predefined fixed block size is equal to one of 64 by 64 luma samples or 32 by 32 luma samples.

In the process (2100), the block size of the current block is further stored with the affine parameters and the flag.

In the process (2100), base control point motion vectors (CPMVs) are determined for the affine ME in the pre-analysis stage, where the base CPMVs are a start point of the affine ME.

In an example, the base CPMVs are determined based on a selected translational motion vector (MV) of the current block that is derived based on a translational ME performed on the current block. In an example, the base CPMVs are determined based on an average of a set of translational MVs of the subblocks of the current block, where the set of MVs of the subblocks is derived by performing the translational ME on the subblocks of the current block. In an example, the base CPMVs are determined based on the set of translational MVs of the subblocks of the current block. In an example, the base CPMVs are determined based on a constructed affine predictor of the current block, where the constructed affine predictor is determined based on translational MVs of neighboring blocks of the current block that are determined in the pre-analysis stage. In an example, the base CPMVs are determined based on an affine model that is inherited from a neighboring block of the current block.

The stored affine parameters include one of control point motion vector values, parameters associated with a 4-parameter affine motion model, parameters associated with a 6-parameter affine motion model, or an integer with N bits.

To perform the affine ME on the current block of the current picture to determine the affine parameters, an initial predictor of the current block is determined based on the base CPMVs of the current block. A first predictor of the current block is determined based on the initial predictor. The first predictor is equal to a sum of (i) the initial predictor of the current block, (ii) a product of a first component of a gradient value of the initial predictor and a first component of a motion vector difference associated with the initial predictor and the first predictor, and (iii) a product of a second component of the gradient value of the initial predictor and a second component of the motion vector difference.

CPMVs of the current block that correspond to the affine parameters are further determined based on an N-th predictor associated with the current block in response to one of: (i) N being equal to the reduced iteration number, and (ii) a motion vector difference associated with the N-th predictor and a (N+1)-th predictor of the current block being zero. Prediction samples of the current block are determined based on the determined CPMVs. The cost value is associated with the prediction samples of the current block and initial samples of the current block.

In some embodiments, a translational ME is skipped for the current block in response to the current block being performed with the affine ME in the pre-analysis stage and the flag indicating that the cost value of the current block is less than the total cost value of the subblocks of the current block. The affine parameters are determined based on another affine ME.

In some embodiments, affine parameters of the current block are determined as the stored affine parameters in response to the current block being performed with the affine ME in the pre-analysis stage and the flag indicating that the cost value of the current block is less than the total cost value of the subblocks of the current block.

In some embodiments, the affine parameters of the current block are determined based on another affine ME. The other affine ME is performed based on (i) a full resolution current picture and one or more full-resolution reference pictures of the current picture and (ii) a starting point generated based on the stored affine parameters.

In some embodiments, an affine merge candidate for the current block is skipped based on a delta between candidate affine parameters associated with the affine merge candidate and the stored affine parameters being larger than a threshold.

Then, the process proceeds to (S2199) and terminates.

The process (2100) can be suitably adapted. Step(s) in the process (2100) can be modified and/or omitted. Additional step(s) can be added. Any suitable order of implementation can be used.

In some embodiments, a decoder can receive coded information of the current. The coded information indicates that the current block is predicted based on the stored affine parameters that are determined in the pre-analysis stage. The decoder can perform an affine prediction to reconstruct the current block based on an affine model. The affine model can include affine parameters associated with the affine parameters that are determined in the pre-analysis stage.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
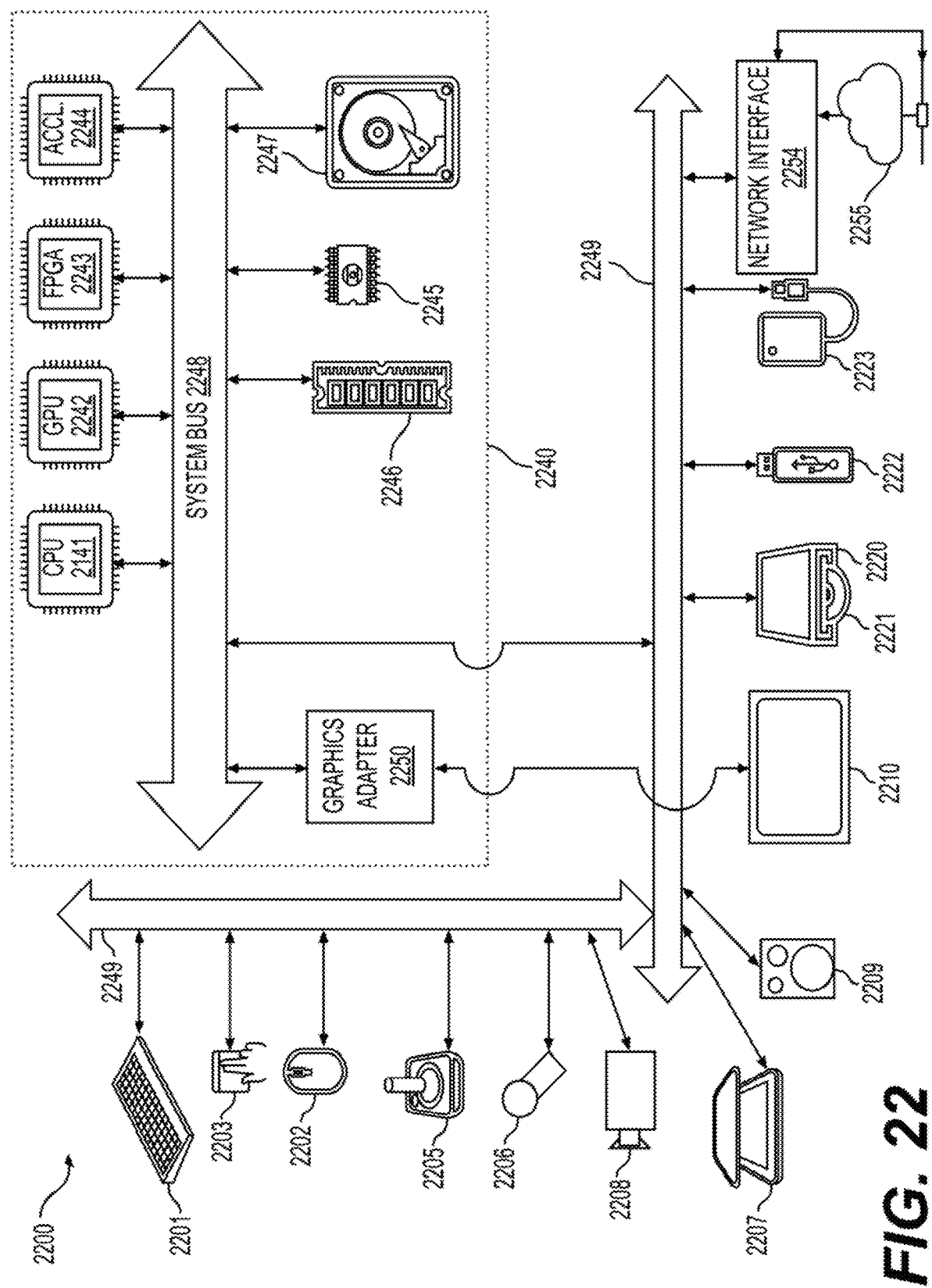
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding performed in a video encoder, the method comprising:
    performing an affine motion estimation (ME) on a current block of a current picture to determine affine parameters of the current block in a pre-analysis stage based on at least one of (i) a down-scaled current picture that is down scaled from the current picture and one or more down-scaled reference pictures of the current picture, (ii) a simplified configuration, and (iii) a block size of the current block being equal to or larger than a predefined fixed block size;

storing the affine parameters of the current block determined in the pre-analysis stage;

determining affine parameters of the current block based on the affine parameters stored in the pre-analysis stage; and reconstructing the current block based on the determined affine parameters of the current block.

2. The method of claim 1, wherein the storing further comprises:

storing the affine parameters of the current block determined in the pre-analysis stage when a cost value of the current block is less than a total cost value of subblocks of the current block; and storing a flag that indicates whether the cost value of the current block is less than the total cost value.

3. The method of claim 2, wherein the performing the affine ME based on the simplified configuration further comprises one of:

performing the affine ME based on a uni-prediction in which one of the one or more down-scaled reference pictures is applied;

performing the affine ME without a prediction refinement using optical flow (PROF) process; or performing the affine ME with a reduced iteration number.

4. The method of claim 1, wherein the predefined fixed block size is equal to one of 64 by 64 luma samples or 32 by 32 luma samples.

5. The method of claim 2, further comprising:

storing the block size of the current block with the affine parameters and the flag.

6. The method of claim 3, further comprising:

determining base control point motion vectors (CPMVs) for the affine ME in the pre-analysis stage, the base CPMVs being a start point of the affine ME.

7. The method of claim 6, wherein the determining the base CPMVs further comprises one of:

determining the base CPMVs based on a selected translational motion vector (MV) of the current block that is derived based on a translational ME performed on the current block;

determining the base CPMVs based on an average of a set of translational MVs of the subblocks of the current block, the set of MVs of the subblocks being derived by performing the translational ME on the subblocks of the current block;

determining the base CPMVs based on the set of translational MVs of the subblocks of the current block;

determining the base CPMVs based on a constructed affine predictor of the current block, the constructed affine predictor being determined based on translational MVs of neighboring blocks of the current block that are determined in the pre-analysis stage; or determining the base CPMVs based on an affine model that is inherited from a neighboring block of the current block.

8. The method of claim 1, wherein the stored affine parameters include one of control point motion vector values, parameters associated with a 4-parameter affine motion model, parameters associated with a 6-parameter affine motion model, or an integer with N bits.

9. The method of claim 6, wherein the performing the affine ME on the current block of the current picture to determine the affine parameters further comprises:

determining an initial predictor of the current block based on the base CPMVs of the current block; and determining a first predictor of the current block based on the initial predictor, the first predictor being equal to a sum of (i) the initial predictor of the current block, (ii) a product of a first component of a gradient value of the initial predictor and a first component of a motion vector difference associated with the initial predictor and the first predictor, and (iii) a product of a second component of the gradient value of the initial predictor and a second component of the motion vector difference.

10. The method of claim 9, wherein the performing the affine ME on the current block of the current picture to determine the affine parameters further comprises:

determining CPMVs of the current block that correspond to the affine parameters based on an N-th predictor associated with the current block when one of:

(i) N being equal to the reduced iteration number, and (ii) a motion vector difference associated with the N-th predictor and a (N+1)-th predictor of the current block being zero; and determining prediction samples of the current block based on the determined CPMVs, the cost value being associated with the prediction samples of the current block and initial samples of the current block.

11. The method of claim 2, wherein the determining the affine parameters of the current block further comprises:

skipping a translational ME for the current block when the current block being performed with the affine ME in the pre-analysis stage and the flag indicating that the cost value of the current block is less than the total cost value of the subblocks of the current block; and determining the affine parameters based on another affine ME.

12. The method of claim 2, wherein the determining the affine parameters of the current block further comprises:

determining the affine parameters of the current block as the stored affine parameters when the current block being performed with the affine ME in the pre-analysis stage and the flag indicating that the cost value of the current block is less than the total cost value of the subblocks of the current block.

13. The method of claim 1, wherein the determining the affine parameters of the current block further comprises:

determining the affine parameters based on another affine ME, the other affine ME being performed based on (i) a full resolution current picture and one or more full-resolution reference pictures of the current picture and (ii) a starting point generated based on the stored affine parameters.

14. The method of claim 1, wherein the determining the affine parameters of the current block further comprises:

skipping an affine merge candidate for the current block based on a delta between candidate affine parameters associated with the affine merge candidate and the stored affine parameters being larger than a threshold.

15. A method of processing visual media data, the method comprising:

processing a bitstream that includes the visual media data according to a format rule, wherein the bitstream includes coded information for a current block of a current picture; and the format rule specifies that:

an affine motion estimation (ME) is performed on the current block of the current picture to determine affine parameters of the current block in a pre-analysis stage based on at least one of (i) a down-scaled current picture that is down scaled from the current picture and one or more down-scaled reference pictures of the current picture, (ii) a simplified configuration, and (iii) a block size of the current block being equal to or larger than a predefined fixed block size, affine parameters of the current block are determined based on affine parameters stored in the pre-analysis stage; and the current block is reconstructed based on the affine parameters of the current block.

16. The method of claim 15, wherein the format rule further specifies that:
the affine ME is performed based on a uni-prediction in which one of the one or more down-scaled reference pictures is applied;
the affine ME is performed without a prediction refinement using optical flow (PROF) process; or
the affine ME is performed with a reduced iteration number.

17. The method of claim 15, wherein the predefined fixed block size is equal to one of 64 by 64 luma samples or 32 by 32 luma samples.

18. The method of claim 15, wherein the format rule further specifies that:
the affine parameters of the current block are determined in the pre-analysis stage when a cost value of the current block is less than a total cost value of subblocks of the current block;
a flag indicates whether the cost value of the current block is less than the total cost value; and
the block size of the current block is indicated with the affine parameters and the flag.

19. The method of claim 18, wherein the format rule further specifies that:
base control point motion vectors (CPMVs) are determined for the affine ME in the pre-analysis stage, the base CPMVs being a start point of the affine ME.

20. The method of claim 19, wherein the format rule further specifies that:
the base CPMVs are determined based on a selected translational motion vector (MV) of the current block that is derived based on a translational ME performed on the current block;
the base CPMVs are determined based on an average of a set of translational MVs of the subblocks of the current block, the set of MVs of the subblocks being derived by performing the translational ME on the subblocks of the current block;
the base CPMVs are determined based on the set of translational MVs of the subblocks of the current block;
the base CPMVs are determined based on a constructed affine predictor of the current block, the constructed affine predictor being determined based on translational MVs of neighboring blocks of the current block that are determined in the pre-analysis stage; or
the base CPMVs are determined based on an affine model that is inherited from a neighboring block of the current block.

* * * * *